(12) United States Patent
Shibuya

(10) Patent No.: US 8,318,294 B2
(45) Date of Patent: Nov. 27, 2012

(54) OPTICAL FILM, PROCESS FOR PRODUCING THE SAME, AND POLARIZATION PLATE UTILIZING THE FILM

(75) Inventor: Masahiro Shibuya, Kobe (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 820 days.

(21) Appl. No.: 12/310,092

(22) PCT Filed: Jul. 12, 2007

(86) PCT No.: PCT/JP2007/063897
§ 371 (c)(1),
(2), (4) Date: Feb. 10, 2009

(87) PCT Pub. No.: WO2008/023501
PCT Pub. Date: Feb. 28, 2008

(65) Prior Publication Data
US 2009/0324921 A1    Dec. 31, 2009

(30) Foreign Application Priority Data

Aug. 24, 2006    (JP) .................................. 2006-227659

(51) Int. Cl.
*B29D 11/00* (2006.01)
*B32B 9/00* (2006.01)
(52) U.S. Cl. ........................................ 428/220; 264/1.1
(58) Field of Classification Search .................. 428/220; 264/1.1
See application file for complete search history.

(56) References Cited

U.S. PATENT DOCUMENTS

| | | | |
|---|---|---|---|
| 8,211,345 B2 * | 7/2012 | Shibuya | 264/212 |
| 2006/0115610 A1 * | 6/2006 | Nagashima | 428/1.3 |
| 2010/0002297 A1 * | 1/2010 | Shibuya | 359/485 |

FOREIGN PATENT DOCUMENTS

| | | | |
|---|---|---|---|
| JP | 2002296422 A | * | 10/2002 |
| JP | 2004-168981 A | | 6/2004 |
| JP | 2005-017328 A | | 1/2005 |
| JP | 2005-104556 A | | 4/2005 |

OTHER PUBLICATIONS

Machine_English_Translation_JP_2002296422_A; Optical Retardation film, Method for Manufacturing the same, and Elliptically Polarizing Plate; Oct. 9, 2002; JPO; whole document.*

* cited by examiner

*Primary Examiner* — David Sample
*Assistant Examiner* — Tahseen N Khan
(74) *Attorney, Agent, or Firm* — Holtz, Holtz, Goodman & Chick, PC

(57) ABSTRACT

An optical film that even in the event of aging (storage) of optical film formed into thin film and large width in the form of lengthy roll, is free from the danger of sticking failure and protrusion failure attributed to uplift of the film due to local film friction; a process for producing such an optical film; and a polarization plate utilizing the optical film. The optical film is one of large width containing a plasticizer, produced by a solution casting process, wherein the value (X) calculated by formula (1) from the value (A) measured by TOF-SIMS with respect to the plasticizer lying in the surface-side central area of the optical film and the value (B) measured by TOF-SIMS with respect to the amount of plasticizer lying in the backside central area of the optical film is different from the value (X') calculated by formula (2) from the value (A') measured by TOF-SIMS with respect to the amount of plasticizer lying in the surface-side two lateral edge portions of the optical film and the value (B') measured by TOF-SIMS with respect to the amount of plasticizer lying in the backside two lateral edge portions of the optical film, and wherein the value (X) is smaller than the value (X').

11 Claims, 5 Drawing Sheets

OPTICAL FILM, PROCESS FOR PRODUCING THE SAME, AND POLARIZATION PLATE UTILIZING THE FILM

This application is the United States national phase application of International Application PCT/JP2007/063897 filed Jul. 12, 2007.

TECHNICAL FIELD

The present invention relates to an optical film, a process for producing the same, and a polarization plate utilizing the film, and specifically to an optical film exhibiting enhanced blocking resistance within itself, a process for producing the same, and a polarization plate utilizing the film. Herein, in the present invention, an optical film refers to a functional film used for various display devices such as a liquid crystal display, a plasma display, an organic EL display, a field emission display, or an electronic paper display, including a polarization plate protective film, a retardation plate, a reflection plate, a viewing angle enlarging film, an optical compensation film, an antiglare film, an antireflection film, a brightness enhancement film, a color compensation film, a color separation film, a UV or infrared cutting film, an antistatic film, and a conductive film.

BACKGROUND

Over recent years, with the popularization of car-interior displays, large-screen TV sets, mobile phones, and lap-top computers, there is an increasing demand for liquid crystal displays (hereinafter also referred to LCDs) which serve in a category of various display devices. LCDs have been widely used as monitors due to their small footprint and low energy consumption features, compared to old-fashioned CRT displays, and have become common in application to TV sets. For these LCDs, various optical films such as polarization films or retardation films are used.

Such an LCD is structured in such a manner that polarization plates are provided on both sides of a liquid crystal cell. A polarization plate passes only light of a polarized wave plane from a predetermined direction. Therefore, the polarization plate plays a significant role in visualizing variations of the orientation of a liquid crystal via an electric field in a liquid crystal display. Namely, performance of the liquid crystal display largely depends on performance of the polarization plate. The polarization plate is commonly structured in such a manner that protective films are laminated on both sides of a polarizer. In some cases, such protective films have a retardation compensation function. LCDs are structured by laminating thus-structured polarization plates to a liquid crystal cell. Protective films are provided to enhance durability of a polarizer. Conventionally, as protective films used for polarization plates, optical films, which are transparent and exhibit excellent physical and mechanical properties, as well as minimal dimensional variation against varying temperature or humidity, have been used.

Recently, with the increasing demand for various display devices, productivity enhancement has been demanded for optical films for use in these devices. In order to increase productivity of optical films, width increase of the optical films and a high-rate production process are needed. Further, to make various display devices thinner, thinner and lighter optical films have been sought. Still further, with realization of larger screen sizes of various display devices, width increase of optical films has also been demanded. Further, for higher productivity, winding of longer films on a single core has been in progress.

Further, to improve mainly mechanical strength of these optical films, and also film characteristics, storage stability, and optical characteristics, it is necessary to add, to the optical films, various additives (e.g., a plasticizer, an antioxidant, a UV absorbent, a matting agent, a conductive substance, an antistatic agent, a flame retardant, and a lubricant).

Conventionally, such optical films have been produced via a solution casting film forming method wherein a dope, prepared by dissolving a resin and various additives in a solvent, is cast on an endless support, and then the solvent is removed in a drying process to wind the film. When optical films are produced via the solution casting film forming method, optical characteristics and flatness thereof may be adjusted by stretching employing a tenter after film formation.

However, with speeding-up and longer film winding for the purpose of thinning, width increase, and productivity enhancement of optical films, damage (e.g., a convex defect of a wound film and sticking during storage), which was not noted in conventional products, has become obvious. Such damage, resulting in defective damage after polarization plate and panel processing, needs to be eliminated. Herein, "convex defect" refers to "embossment" caused when air, having been captured between film layers during winding in film production, remains without coming out, or when foreign materials entering therebetween are generated.

Especially in the case of width increase, the weight of a wound body causes the center portion to bend on its own. Since the load is concentrated in the center portion, it is very probable that a sticking defect over time (during storage) occurs and a convex defect, resulting from embossing of the film due to local film friction, occurs.

With regard to such defects becoming obvious with film thinning, investigations have so far been conducted. For example, there is known a method wherein dynamic friction coefficients of one side of a film and the other side thereof are controlled by adding solid fine particles (for example, refer to Patent Document 1). Further known is a method wherein a cellulose ester film, having been wound on a winding core, is wrapped with a wrapping material of a moisture permeability of 1 g/m$^2$, whereby occurrence of a foreign material defect or a sticking defect of the film itself during long term storage is prevented (for example, refer to Patent Document 2).

In the methods of Patent Documents 1 and 2, effects are exhibited in optical films featuring conventional width. However, these are insufficient countermeasures on the above defects (for example, a convex defect of a wound film and sticking during storage), having become obvious with speeding-up and longer film winding for the purpose of thinning, width increase, and productivity improvement of optical films, which have been pursued over recent years.

In view of such situations, it has been desirable to develop an optical film wherein there is no tendency of occurrence of a sticking defect over time (during storage) in the form of a long wound film of less thickness and increased width, and of occurrence of a convex defect resulting from embossing of the film due to local film friction; a process for producing an optical film; and a polarization plate utilizing the optical film.

Patent Document 1: Unexamined Japanese Patent Application Publication (hereinafter also referred to as JP-A) No. 2004-168981

Patent Document 2: JP-A No. 2005-104556

DISCLOSURE OF THE INVENTION

Problems to be Solved by the Invention

In view of the above situations, the present invention was completed. An object of the present invention is to provide an optical film wherein there is no tendency of occurrence of a sticking defect over time (during storage) in the form of a long roll of an optical film of less thickness and increased width, and of occurrence of a convex defect resulting from embossing of the film due to local film friction; a process for producing an optical film; and a polarization plate utilizing the optical film.

Means to Solve the Problems

The object of the present invention can be achieved via the following constitutions:

1. In an optical film, which contains at least one type of plasticizer and is produced in a roll form, wherein a dope, prepared by dissolving a raw material resin in a solvent, is cast on an endless support to form a web, which is then peeled from the endless support, followed by drying and winding, an optical film wherein the total width of the optical film is 1500 mm-4000 mm; there is a difference between value X, calculated by Expression 1 from value A obtained by determining the amount of a plasticizer present in the center portion on the front surface side of the optical film via TOF-SIMS (time of flight secondary ion mass spectrometry) and value B obtained by determining the amount of a plasticizer present in the center portion on the rear surface side via TOF-SIMS, and value X', calculated by Expression 2 from value A' obtained by determining the amount of a plasticizer present in an edge portion on the front surface side of the optical film via TOF-SIMS and value B' obtained by determining the amount of a plasticizer present in an edge portion on the rear surface side via TOF-SIMS; and value X is smaller than value X'.

$X=\{A/(A+B)\}\times 100$     Expression 1

$X'=\{A'/(A'+B')\}\times 100$     Expression 2

2. The optical film, described in item 1, wherein above value X is 20-49 and $A \leq B$.

3. The optical film, described in items 1 or 2, wherein above value X' is 5-30 larger than value X and $A' \leq B'$.

4. The optical film, described in any one of items 1-3, wherein an optical film in the roll form features a total length of 1500 m-10000 m, and the ratio of the dynamic friction coefficient of the optical film on the winding outer side to the dynamic friction coefficient of the optical film on the winding core side is 0.95-1.05.

5. The optical film, described in any one of items 1-4, wherein the width of the edge portion is a distance determined between the edge as the reference point and a given location located in the range of 10%-40% of the total width of the optical film.

6. The optical film, described in any one of items 1-5, wherein the raw material resin is a cellulose ester.

7. The optical film, described in any one of items 1-6, wherein the elongation and contraction rates, represented by following Expressions 3 and 4, of the optical film after being allowed to stand for 7 days at a temperature of 30° C. and a relative humidity of 80%, each are −0.10%-+0.10%.

(Length in the MD direction after treatment−length in the MD direction prior to treatment)/length in the MD direction prior to treatment×100=elongation and contraction rate in the MD direction     Expression 3

(Length in the TD direction after treatment−length in the TD direction prior to treatment)/length in the TD direction prior to treatment×100=elongation and contraction rate in the TD direction     Expression 4

8. In a process for producing the optical film, described in any one of items 1-7, which contains at least one type of plasticizer and is produced in a roll form, wherein a dope, prepared by dissolving a raw material resin in a solvent, is cast on an endless support to form a web, which is then peeled from the endless support, followed by drying and winding, a process for producing an optical film wherein the above dope is cast on an endless support; while the above web is peeled from the endless support, the center portion in the transverse direction and the edge portions on both sides of the web are heated at different temperatures; and the heating temperature of the center portion is higher than that of the edge portions in the anterior portion of the endless support, and the heating temperature of the center portion is lower than that of the edge portions in the posterior portion of the endless support.

9. The process for producing an optical film, described in item 8, wherein the heating temperature of the center portion in the anterior portion of the endless support is 1° C.-20° C. higher than that of the edge portions on the both sides.

10. The process for producing an optical film, described in items 8 or 9, wherein the heating temperature of the center portion in the posterior portion of the endless support is 1° C.-20° C. lower than that of the edge portions on the both sides.

11. The process for producing an optical film, described in any one of items 8-10, wherein each of the widths of the edge portions is a distance determined between either of the edges on the both sides as the reference point and a corresponding given location located in the range of 10%-40% of the total width of a web.

12. The process for producing an optical film, described in any one of items 8-11, wherein an optical film in the roll form features a length of 1500 m-10000 m.

13. A polarization plate utilizing the optical film described in any one of items 1-7.

Effects of the Invention

There was able to be provided an optical film having no tendency of occurrence of a sticking defect over time (during storage) in the form of a long wound film of less thickness and increased width, and of occurrence of a convex defect resulting from embossing of the film due to local film friction; a process for producing an optical film; and a polarization plate utilizing this optical film, resulting in enhanced productivity and efficiency.

Figures 1A, 1B:
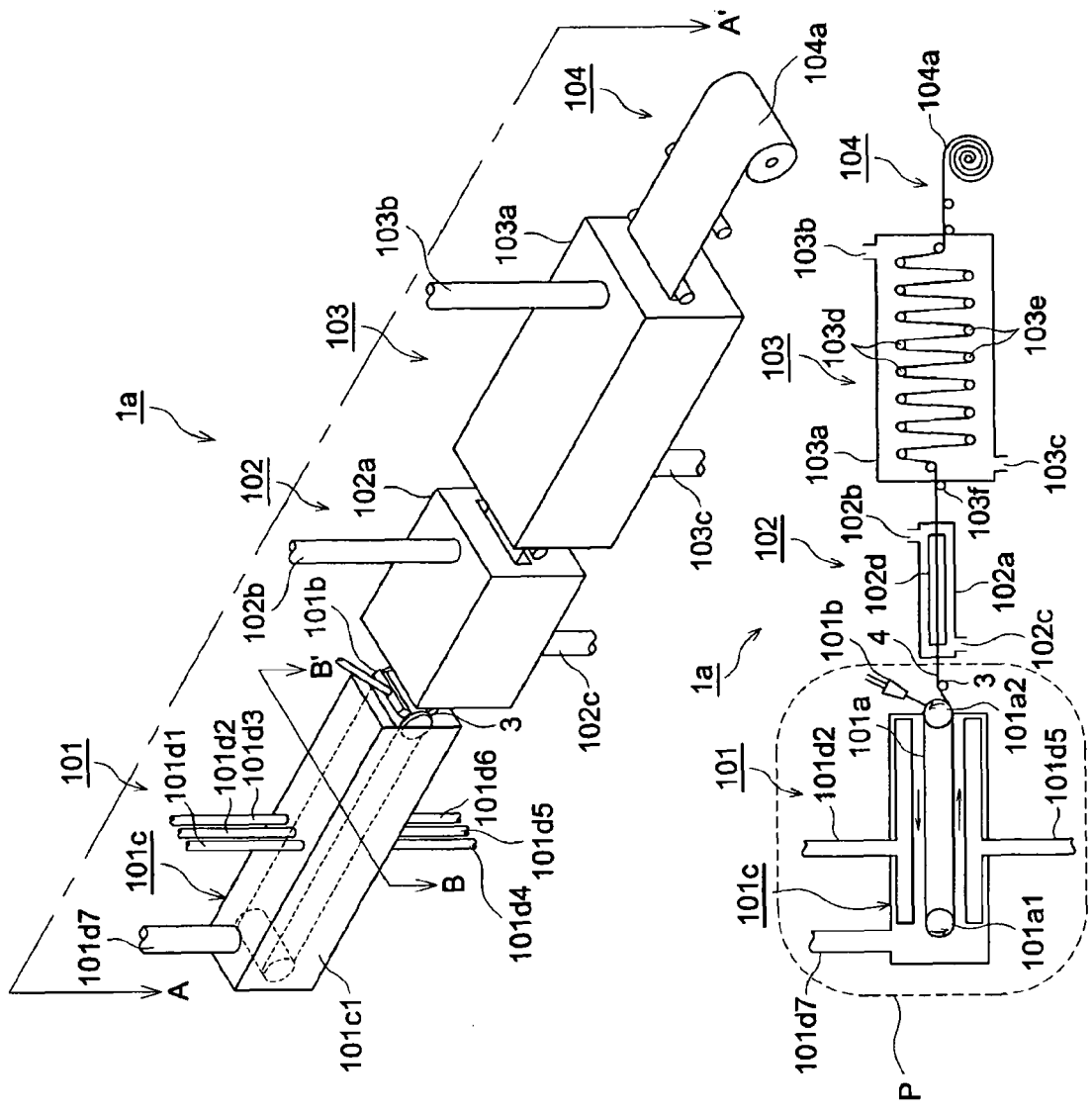
FIG. 1 A set of schematic views of a production apparatus of an optical film via a solution casting film forming method FIG. 2 A set of schematic views of other production apparatuses of an optical film via a solution casting film forming method FIG. 3 An enlarged schematic sectional view along line B-B' in FIG. 1(a)

DESCRIPTION OF THE ALPHANUMERICAL DESIGNATIONS 1a-1d: production apparatuses
101: solution casting film forming process
101a: mirror-finished band-like metal casting belt
101b: dice
101c: heating apparatus
101c1: outer box
101d1-101d6: hot air feed pipes
101d7: exhaust pipe
101e1: first hot air blow header
101e11: hot air blow outlet
101e2: second hot air blow header
101e21: hot air blow outlet
101e3: third hot air blow header
101e31: hot air blow outlet
101e4: fourth hot air blow header
101e41: hot air blow outlet
101e5: fifth hot air blow header
101e51: hot air blow outlet
101e6: sixth hot air blow header
101e61: hot air blow outlet
102: stretching process
103: drying process
104: winding and collecting process
2: dope
4: optical film
5: polarization plate
501: polarizer
502: protective film
E, F, and G: width

BEST MODE TO CARRY OUT THE INVENTION

A mode to carry out the present invention will now be described with reference to FIG. 1-FIG. 6. However, the present invention is not limited thereto.

FIG. 1 is a set of schematic views of a production apparatus of an optical film via a solution casting film forming method. FIG. 1(a) is a schematic oblique perspective view of a production apparatus of an optical film via a solution casting film forming method wherein drying is carried out in a drying process after casting and tenter conveyance. FIG. 1(b) is a schematic sectional view along line A-A' in FIG. 1(a).

In the figure, the designation 1a represents a production apparatus of an optical film via a solution casting film forming method. Production apparatus 1a incorporates solution casting film forming process 101, stretching process 102, drying process 103, and winding and collecting process 104.

Solution casting film forming process 101 incorporates mirror-finished band-like metal casting belt (hereinafter referred to as "belt") 101a, being an endless support moving in an endless manner; dice 101b casting dope 2 (refer to FIG. 4), prepared by dissolving a optical film-forming resin in a solvent, on belt 101a; and heating apparatus 101c removing a solvent to peel dope 2 (refer to FIG. 4), having been cast on belt 101a, from belt 101a. The designation 101c1 represents a drying box and the designations 101d1-101d6 represent hot air feed pipes arranged in drying box 101c1. The designation 101d7 represents an exhaust pipe. Belt 101a is held by holding roll 101a1 and holding roll 101a2 and rotationally moves (in the arrow direction in the figure) between holding roll 101a1 and holding roll 101a2 with rotation of the holding rolls. The designation 3 represents a peeling point where a solidified web in the state of being peelable from belt 101a, which has been formed by removing a solvent from a dope cast on belt 101a, is peeled. The designation 4 represents a peeled optical film. Solution casting film forming process 101 will be detailed later with reference to FIG. 3-FIG. 5.

Stretching process 102 incorporates outer box 102a having dry air inlet 102b and exhaust outlet 102c, as well as tenter stretching apparatus 102d incorporated in outer box 102a. A tenter used for tenter stretching apparatus 102d is not specifically limited, including, for example, a clip tenter and a pin tenter which can selectively be used, as appropriate. Herein, dry air inlet 102b and exhaust outlet 102c may be used vice versa. An optical film is stretched to a desired width in stretching process 102, and the solvent amount thereof is preferably 5% by mass-30% by mass in view of scratching, contraction rate, and deforming.

Drying process 103 incorporates drying box 103a having dry air inlet 103b and exhaust outlet 103c, as well as upper conveyance roll 103d and lower conveyance roll 103e conveying optical film 4. Upper conveyance roll 103d is paired with lower conveyance roll 103e to form a set of the upper and lower ones, and plural sets thereof are combined for use in the constitution of the process. The designation 103f represents a conveyance roll conveying optical film 4, coming out of stretching process 102, to drying process 103. The number of conveyance rolls arranged in drying process 103 is determined, as appropriate, based on the drying conditions and method, and the length of an optical film produced. Upper conveyance roll 103d and lower conveyance roll 103e are freely rotatable rolls independent of rotational drive with a drive source. Not all conveyance rolls used between the drying process and the winding process are freely rotatable commonly, it is necessary to provide one to several conveyance drive rolls (rolls rotationally driven with a drive source). Basically, the conveyance drive rolls are used to convey an optical film with the drive source thereof. Therefore, a mechanism is provided to synchronize conveyance of the optical film with rotation of the drive rolls via nipping or suction (air absorption).

Winding and collecting process 104 incorporates a winding apparatus (not shown) winding optical film 4, having been dried, on a winding core to a needed length. The designation 104a represents a roll optical film wound on the winding core. Herein, the temperature during winding is preferably lowered to room temperature to prevent scratching due to contraction after winding or loose winding. This is the same as in the schematic sectional views of production apparatuses of an optical film via a solution casting film forming method shown in FIG. 2(a)-FIG. 2(c). A winder employed may be one commonly used, and winding can be carried out via a winding method such as a constant tension method, a constant torque method, a taper tension method, or a program tension control method of fixed internal stress.

Figure 2:
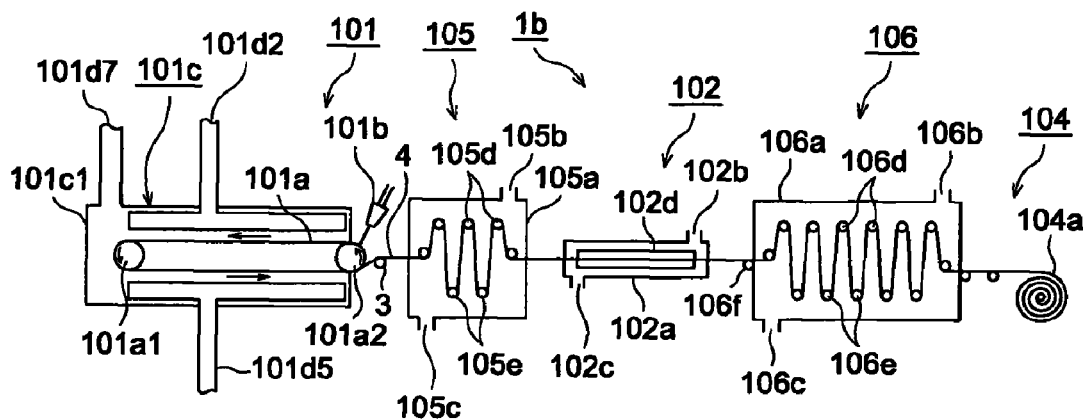
Figure 2:
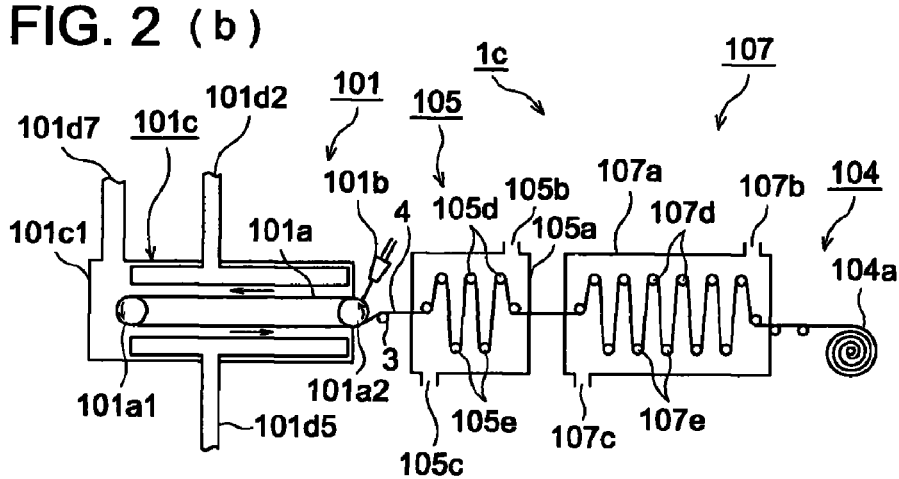
Figure 2:
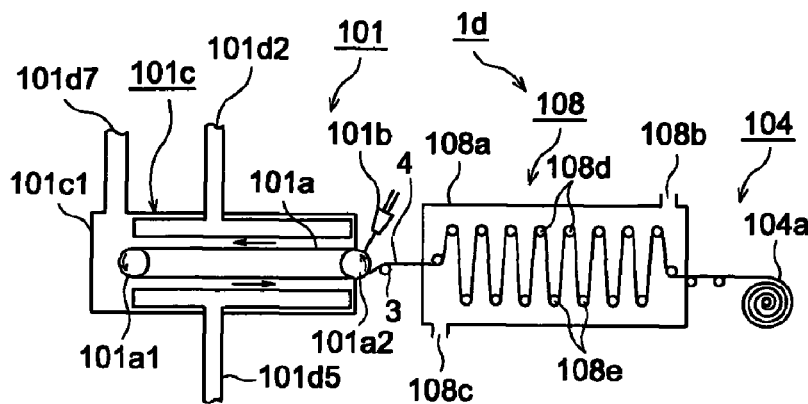

FIG. 2 is a set of schematic views of other production apparatuses of an optical film via a solution casting film forming method. FIG. 2(a) is a schematic view of a production apparatus of an optical film via a solution casting film forming method wherein predrying is carried out in a drying process after casting, followed by tenter conveyance to perform final drying in another drying process. FIG. 2(b) is a schematic view of a production apparatus of an optical film via a solution casting film forming method wherein predrying is carried out in a drying process after casting to perform final drying in another drying process. FIG. 2(c) is a schematic view of a production apparatus of an optical film via a solution casting film forming method wherein drying is carried out in a drying process after casting.

The schematic view of a production apparatus of an optical film via a solution casting film forming method shown by FIG. 2(a) will now be described. In the figure, the designation 1b represents a production apparatus of an optical film via a solution casting film forming method. Production apparatus 1b incorporates casting process 101, first drying process 105, stretching process 102, second drying process 106, and winding and collecting process 104. The difference from the production apparatus shown by FIG. 1(a) is that prior to stretching in stretching process 102, optical film 4 having been peeled from belt 101a is initially dried in first drying process 105. The other processes are the same as in production apparatus 1a shown by FIG. 1(a).

First drying process 105 incorporates drying box 105a having dry air inlet 105b and exhaust outlet 105c, as well as upper conveyance roll 105d and lower conveyance roll 105e conveying optical film 4. Upper conveyance roll 105d is paired with lower conveyance roll 105e to form a set of the upper and lower ones, and plural thereof sets are combined for use in the constitution of the process. It is possible that first drying process 105 controls the amount of a solvent contained in optical film 4 before entering stretching process 102 (which is the same as the stretching process in FIG. 1(a)).

Second drying process 106 incorporates drying box 106a having dry air inlet 106b and exhaust outlet 106c, as well as upper conveyance roll 106d and lower conveyance roll 106e conveying optical film 4. Upper conveyance roll 106d is paired with lower conveyance roll 106e to form a set of the upper and lower ones, and plural sets thereof are combined for use in the constitution of the process (which is the same as the constitution of drying process 105 shown by FIG. 1(a)). The other designations are the same as in FIG. 1(a).

The schematic view of a production apparatus of an optical film via a solution casting film forming method shown by FIG. 2(b) will now be described. In the figure, the designation 1c represents a production apparatus of an optical film via a solution casting film forming method. Production apparatus 1c incorporates casting process 101, first drying process 105, second drying process 107, and winding and collecting process 104. Second drying process 107 incorporates drying box 107a having dry air inlet 107b and exhaust outlet 107c, as well as upper conveyance roll 107d and lower conveyance roll 107e conveying optical film 4. Upper conveyance roll 107d is paired with lower conveyance roll 107e to form a set of the upper and lower ones, and plural sets thereof are combined for use in the constitution of the process (which is the same as the constitution of drying process 105 shown by FIG. 1(a)). The difference from the production apparatus shown by FIG. 2(a) is that no stretching process is incorporated. Therefore, drying to be carried out in the stretching process of FIG. 2(a) needs to be collectively performed only in second drying process 107, which is then preferably designed to be longer than second drying process 106 shown by FIG. 2(a). Optical film 4, having been peeled from the belt, is dried in both first drying process 105 and second drying process 107, and wound and collected in winding and collecting process 104. The other designations are the same as in FIGS. 1(a) and 1(b).

The schematic view of a production apparatus of an optical film via a solution casting film forming method shown by FIG. 2(c) will now be described. In the figure, the designation 1d represents a production apparatus of an optical film via a solution casting film forming method. Production apparatus 1d incorporates casting process 101, drying process 108, and winding and collecting process 104. The difference from the production apparatus shown by FIG. 2(b) is that no first drying process is incorporated. Optical film 4, having been peeled from the belt, is dried in drying process 108, and wound and collected in winding and collecting process 104. Drying process 108 incorporates drying box 108a having dry air inlet 108b and exhaust outlet 108c, as well as upper conveyance roll 108d and lower conveyance roll 108e conveying optical film 4. Upper conveyance roll 108d is paired with lower conveyance roll 108e to form a set of the upper and lower ones, and plural sets thereof are combined for use in the constitution of the process (which is the same as the constitution of drying process 106 shown by FIG. 2(a), but the total length is expanded since the function of first drying process 105 (refer to FIG. 2(a)) is included). The other designations are the same as in FIG. 1(a).

Next, the amount of a residual solvent of an optical film in each of the processes shown by FIG. 1 and FIG. 2(a)-FIG. 2(c) will now be described.

In FIG. 1, the residual solvent amount of an optical film, peeled from belt 101a after cast in casting process 101, is 506 by mass-250% by mass, preferably 80% by mass-140% by mass (which is the same as in FIG. 2(a)-FIG. 2(c)), in view of uniformity of residual stress on peeling from the belt, stretching properties, dimensional stability, and contraction properties during drying.

The residual solvent amount of an optical film after treated with tenter stretching apparatus 102d in stretching process 102 is preferably 5% by mass-30% by mass, more preferably 6% by mass-25% by mass, in view of adjustment of elongation and contraction rate of the optical film in a drying section and scratching.

The residual solvent amount of an optical film after dried in drying process 103 is preferably 0.1% by mass-15% by mass in view of load in the drying process, dimensional stability during storage, and elongation and contraction rate.

In FIG. 2(a), the residual solvent amount of an optical film after dried in first drying process 105 is preferably 5% by mass-40% by mass, more preferably 10% by mass-35% by mass, in view of drying load in stretching process 102 and stretching performance of the stretching process. The residual solvent amount after treatment in stretching process 102 is the same as in FIG. 1. The residual solvent amount after drying in second drying process 106 is the same as that after drying in drying process 103 of FIG. 1.

In FIG. 2(b), the residual solvent amount of an optical film after dried in first drying process 105 is the same as in FIG. 2(a). The residual solvent amount after drying in second drying process 107 is the same as that after drying in drying process 103 of FIG. 1.

In FIG. 2(c), the residual solvent amount of an optical film after dried in drying process 108 is the same as that after drying in drying process 103 of FIG. 1.

In the present invention, a value of the residual solvent amount (% by mass) is defined as a value determined by the relationship: (E−F)/F×100=residual solvent amount (% by mass), provided that the mass of a resin film is F wherein an optical film of a given size is dried at 115° C. for 1 hour, and the mass of the optical film before dried is E.

In the drying processes after a stretching process shown in FIG. 1 and FIG. 2(a) and the drying processes shown in FIG. 2(b) and FIG. 2(c), hot air and infrared radiation may be used individually or in combination. From the viewpoint of simplicity, hot air drying is preferably carried out. Drying temperature varies with the residual solvent amount of a resin film at the time of entering the drying process. In view of drying duration, contraction non-uniformity, and stability of elongation and contraction magnitude, the drying temperature may appropriately be determined based on the residual solvent amount selectively in the range of 30° C.-180° C. Drying may be performed at a constant temperature or at several different temperature settings.

The film thickness of an optical film produced via each of the solution casting film forming methods shown in FIG. 1 and FIG. 2(a)-FIG. 2(c) depends on the intended purposes. For use in a protective film for the polarization plate shown in FIG. 7, the film thickness is 20 μm-120 μm, preferably 40 μm-100 μm.

Figure 3:
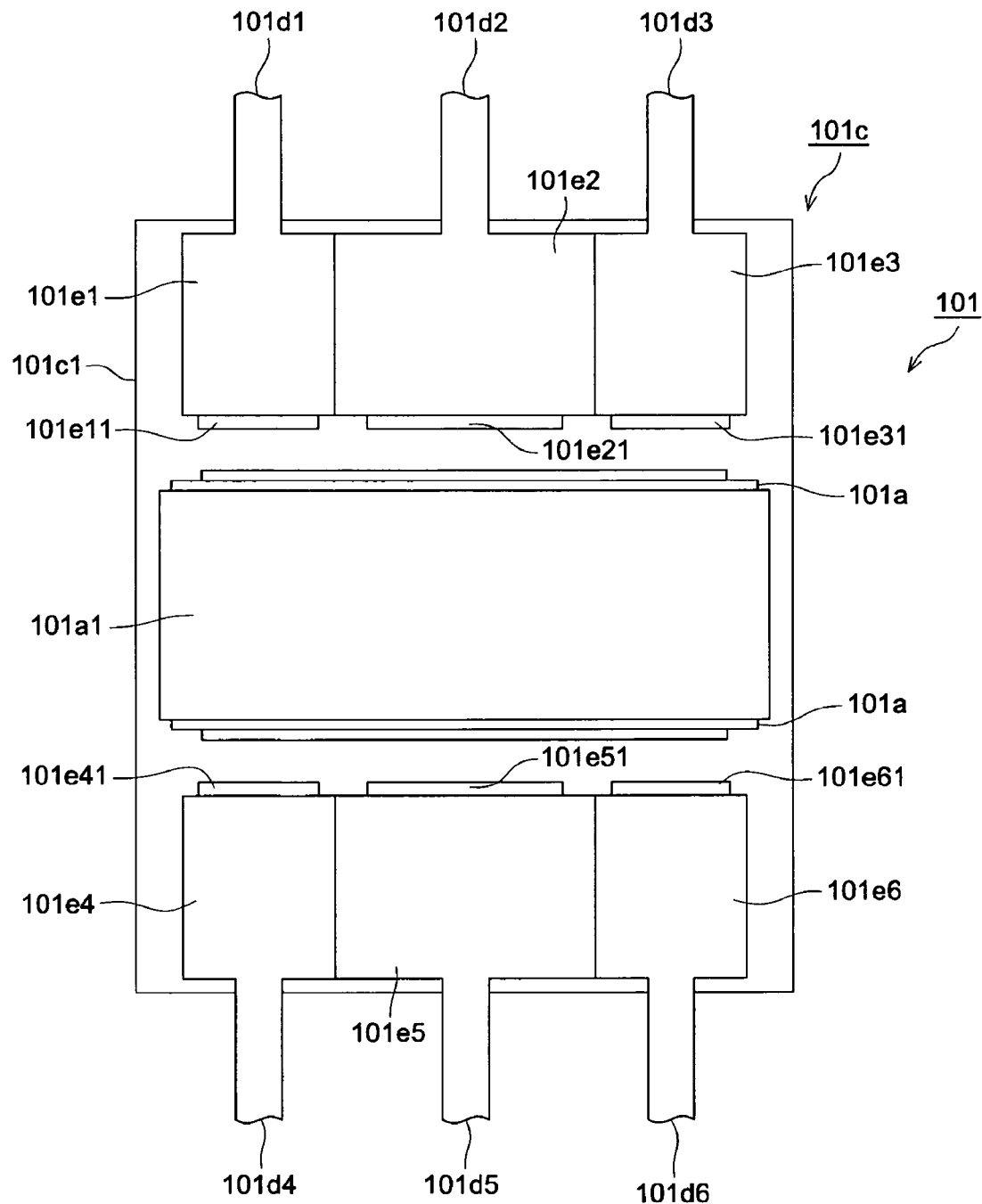

FIG. 3 is an enlarged schematic sectional view along line B-B' in FIG. 1(a).

Heating apparatus 101c incorporates drying box 101c1, first hot air blow header 101e1, second hot air blow header 101e2, third hot air blow header 101e3, fourth hot air blow header 101e4, fifth hot air blow header 101e5, sixth hot air blow header 101e6, exhaust pipe 101d7 (refer to FIG. 1), and hot air feed pipes 101d1-101d6. The designation 101e11 represents the hot air blow outlet of first hot air blow header 101e1. The designation 101e21 represents the hot air blow outlet of second hot air blow header 101e2. The designation 101e31 represents the hot air blow outlet of third hot air blow header 101e3. The designation 101e41 represents the hot air blow outlet of fourth hot air blow header 101e4. The designation 101e51 represents the hot air blow outlet of fifth hot air blow header 101e5. The designation 101e61 represents the hot air blow outlet of sixth hot air blow header 101e6.

First hot air blow header 101e1 and third hot air bow header 101e3 are arranged to dry both edges of a dope cast on the anterior portion of belt 101a. Second hot air blow header 101e2 is arranged to dry the center portion of a dope cast on the anterior portion of belt 101a.

Fourth hot air blow header 101e4 and sixth hot air bow header 101e6 are arranged to dry both edges of a dope cast on the posterior portion of belt 101a. Fifth hot air blow header 101e5 is arranged to dry the center portion of a dope cast on the posterior portion of belt 101a.

Figure 4:
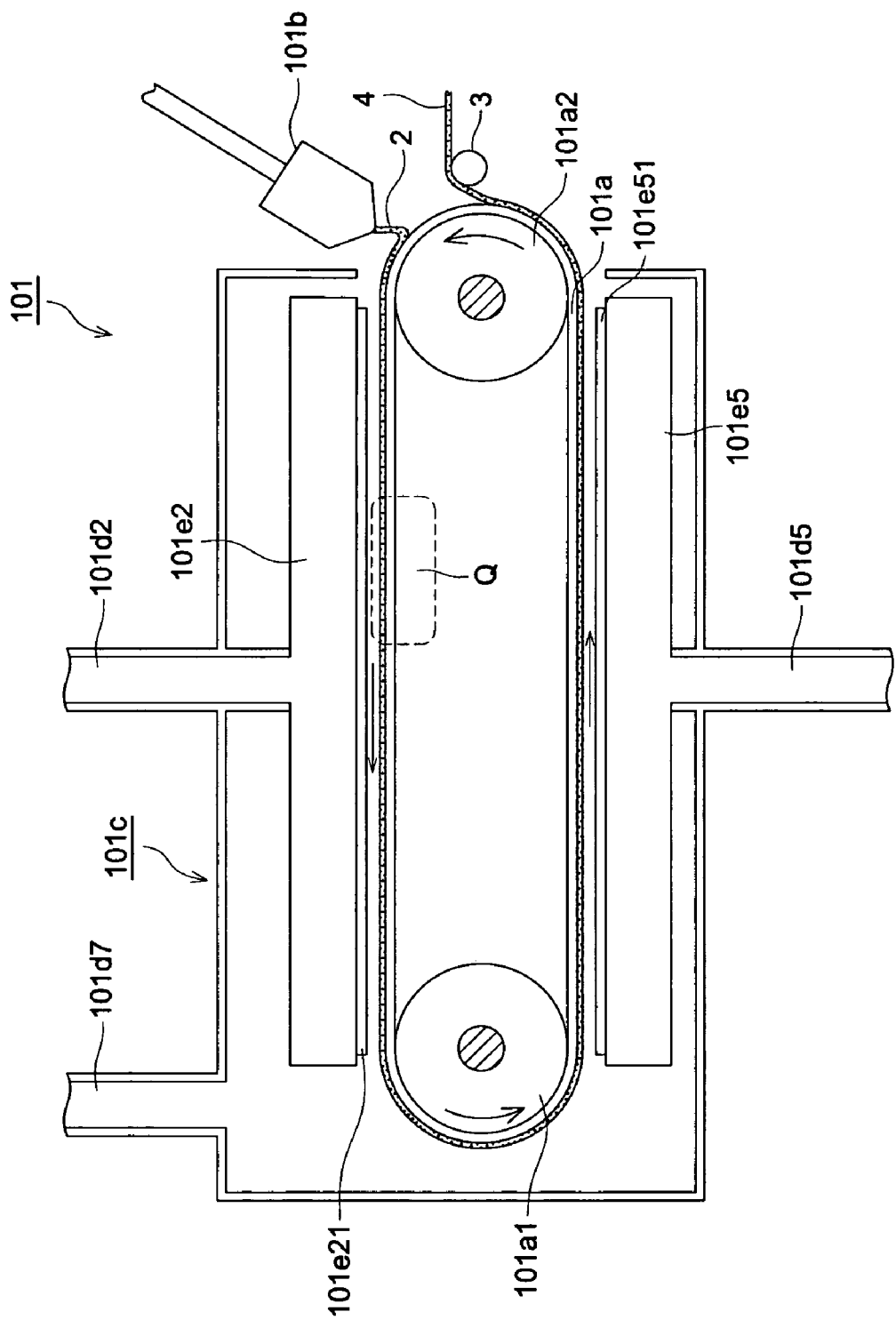
FIG. 4 An enlarged schematic sectional view of the portion represented by P in FIG. 1(b)

FIG. 4 is an enlarged schematic sectional view of the portion represented by P in FIG. 1(b).

Dope 2, having been cast on belt 101a, is sequentially blown with hot air from each of the hot air blow outlets via rotational moving (in the arrow direction in the figure) of belt 101a. Thereby, the solvent in the dope is removed and then a web is formed to give optical film 4, solidified in the state of being peelable from belt 101a, which is conveyed to the next process.

In the present invention, the anterior portion of belt 101a refers to a portion on the top side of belt 101a held between holding roll 101a1 and holding roll 101a2, and the posterior portion of belt 101a refers to a portion on the bottom side of belt 101a held between holding roll 101a1 and holding roll 101a2.

Second hot air blow header 101e2 is arranged to blow hot air to a portion covering the nearly entire length of the anterior of belt 101a. First hot air blow header 101e3 (refer to FIG. 3) and third hot air blow header 101e3 (refer to FIG. 3) are also arranged in the same manner as for second hot air blow header 101e2.

Fifth hot air blow header 101e5 is arranged to blow hot air to a portion covering the nearly entire length of the posterior of belt 101a. Fourth hot air blow header 101e4 (refer to FIG. 3) and sixth hot air blow header 101e6 (refer to FIG. 3) are also arranged in the same manner as for fifth hot air blow header 101e5.

Incidentally, in the examples shown in FIG. 3 and FIG. 4, hot air blow headers are arranged as a heating member to heat a dope in such a manner that hot air is blown to the dope. However, the heating member is not limited to these examples. For example, to heat the rear side of a belt, similar hot air blow headers may be arranged between the top and the bottom side of the belt held with holding rolls, and any heating method other than such a hot air method may be employed.

Figure 5:
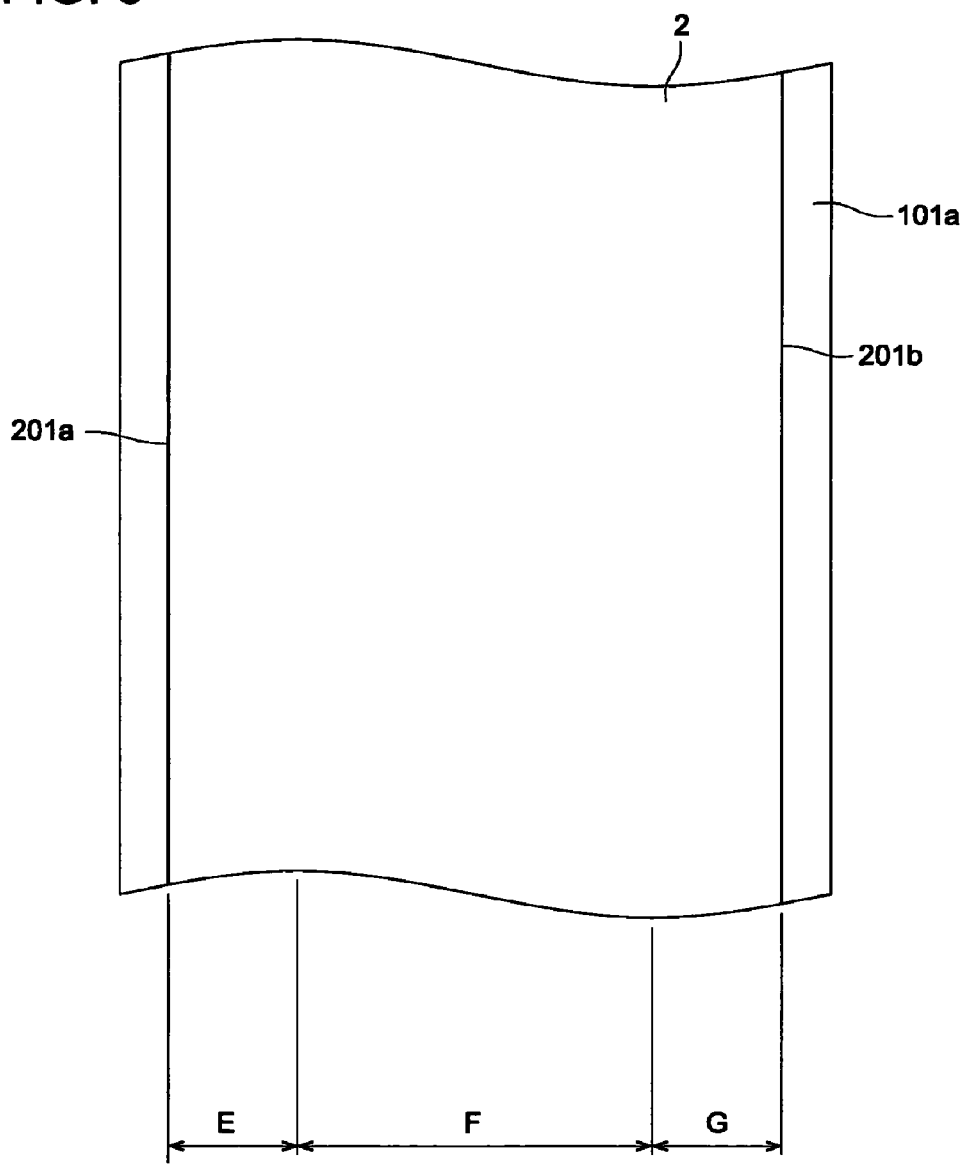
FIG. 5 An enlarged schematic plan view of the portion represented by Q in FIG. 4

FIG. 5 is an enlarged schematic plan view of the portion represented by Q in FIG. 4.

In the figure, E(G) represents the width of an edge portion of dope 2 cast on belt 101a, and F represents the width of the center portion. Width E of an edge portion is preferably a distance determined between edge 201a of dope 2 as the reference point and a given location located in the range of 10%-40% of the total width of dope 2, in view of a TOF-SIMS detected value for the amount of a plasticizer present in the edge and the center portion. Width G of an edge portion is preferably a distance determined between edge 201b of dope 2 as the reference point and a given location located in the range of 10%-40% of the total width of dope 2, in view of a TOF-SIMS detected value for the amount of a plasticizer present in the edge and the center portion. Incidentally, the definition of width E(G) of an edge portion shown in the figure is also applicable to the width of an edge portion of an optical film produced using either of the production apparatuses shown in FIG. 1 or FIG. 2. Herein, the edge portion of the present invention refers to at least one of both edge portions represented by width E(G) shown in the figure.

Using any of the production apparatuses shown in FIG. 1-FIG. 5, when a web is formed by casting a dope, prepared by dissolving a raw material resin in a solvent, on a belt, the center portion and edge portions on both sides of the web in the transverse direction are heated with hot air at different temperatures. And in the anterior portion of the belt, the heating temperature of the center portion is set to be higher than that of the edge portions, while in the posterior portion of the belt, the heating temperature of the center portion is set to be lower than that of the edge portions.

In the anterior portion of the belt, when the heating temperature of the center portion is equal to or lower than that of the edge portions, a TOF-SIMS detected value for the amount of a plasticizer present in each of the center portion and the edge portions in the transverse direction differs from a desired value. Thereby, sticking over time or a convex defect during storage of a roll optical film tends to unfavorably occur.

In the anterior portion of the belt, the heating temperature of the center portion is preferably 1° C.-20° C. higher than that of the edge portions, in view of a TOF-SIMS detected value for the amount of a plasticizer designed to be present in each of the edge portions and the center portion in the transverse direction.

In the posterior portion of the belt, when the heating temperature of the center portion is equal to or higher than that of the edge portions, a TOF-SIMS detected value for the amount of a plasticizer present in each of the center portion and the edge portions in the transverse direction differs from a desired value. Thereby, sticking over time or a convex defect during storage of a roll optical film tends to unfavorably occur.

In the posterior portion of the belt, the heating temperature of the center portion is preferably 1° C.-20° C. lower than that of the edge portions, in view of a TOF-SIMS detected value for the amount of a plasticizer designed to be present in each of the edge portions and the center portion in the transverse direction.

The width of an optical film produced using any of the production apparatuses shown in FIG. 1-FIG. 5 is 1500 mm-4000 mm. It is unfavorable for the width to be less than 1500 mm, since production efficiency is decreased and no response can be made to larger screens of LCDs. It is also unfavorable for the width to exceed 4000 mm, since difficult handling results; it becomes very probable that defects due to the weight of a roll optical film itself occur; and an increased maintenance burden is required with enlargement in size of the apparatus.

With regard to an optical film, having a total length of 1500 mm-10000 mm in a roll form wound on a winding core, which is produced via the production method of the present invention using any of the production apparatuses shown in FIG. 1-FIG. 5, the ratio of the dynamic friction coefficient of the optical film on the winding outer side to the dynamic friction coefficient of the optical film on the winding core side is preferably 0.95-1.05, in view of occurrence of a convex defect over time during storage of the roll optical film. Herein, the winding core side refers to a portion ranging from the winding initiation point to a point 100 m therefrom. And the winding outer side refers to a portion ranging from the termination point to a point 100 m inward therefrom.

The dynamic friction coefficient was determined in such a manner that using a friction tester produced by Tester Sangyo Co., Ltd., measurement was carried out for the center portion (a portion sandwiched by two points each 200 mm away from the width center point) and edge portions (portions each ranging up to 200 mm from both edges) of specimens of a total width of 50 cm each collected at a point 10 m from the winding core side and the winding outer side, at a measurement rate of 100 mm/minute with a load of 300 g under an ambience of 23° C. and 55% RH. The other conditions were based on JIS K-7125.

Determination Method of Dynamic Friction Coefficient

The dynamic friction coefficient is a value calculated by dividing a dynamic friction resistance force obtained above by a load during measurement. And the average value based on the number of measuring times is employed.

In an optical film produced via the production method of the present invention using any of the production apparatuses shown in FIG. 1-FIG. 5, there is a difference between value X, calculated by Expression 1 from value A obtained by determining the amount of a plasticizer present in the center portion on the front surface side of the optical film via TOF-SIMS and value B obtained by determining the amount of a plasticizer present in the center portion on the rear surface side via TOF-SIMS, and value X', calculated by Expression 2 from value A' obtained by determining the amount of a plasticizer present in an edge portion on the front surface side of the optical film via TOF-SIMS and value B' obtained by determining the amount of a plasticizer present in an edge portion on the rear surface side via TOF-SIMS; and value X is smaller than value X'. Herein, the edge portion measured via TOF-SIMS refers to at least either of the edge portions on both sides.

$$X=\{A/(A+B)\}\times 100 \quad \text{Expression 1}$$

$$X'=\{A'/(A'+B')\}\times 100 \quad \text{Expression 2}$$

It is unfavorable that value X is equal to value X', since no plasticizer is localized only on a single surface side, resulting in no effect of preventing sticking, whereby no effects of the present invention are expressed.

Further, it is unfavorable that value X is larger than value X', since no effect of preventing sticking is expressed, resulting in no effects of the present invention.

Incidentally, a side contacting the belt refers to the rear surface side, and a side not contacting the belt refers to the front surface side.

Value X is preferably 20-49 with the relationship of $A \leqq B$ in view of film physical properties, specifically curling properties, sticking resistance, polarization plate processability, and coatability.

Value X' is preferably 5-30 larger than value X with the relationship of $A' \leqq B'$ in view of film physical properties, specifically sticking resistance.

In an optical film produced via the production method of the present invention using any of the production apparatuses shown in FIG. 1-FIG. 5, the elongation and contraction rate after being allowed to stand for at a temperature of 30° C. and a relative humidity of 80% for 7 days is preferably −0.10%-+0.10% in view of occurrence of a convex defect over time during storage of the optical film of a roll form.

Figure 6:
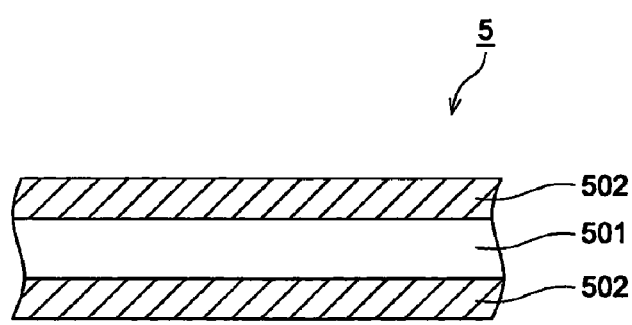
FIG. 6 A schematic sectional view of a polarization plate utilizing the optical film of the present invention

FIG. 6 is a schematic sectional view of a polarization plate utilizing the optical film of the present invention.

In the figure, the designation 5 represents a polarization plate. Polarization plate 5 incorporates polarizer 501 and protective film 502 laminated on both sides thereof. In some cases, a protective film may have a retardation compensation function. An LCD is structured in such a manner that such a structured polarization plate is laminated to a liquid crystal cell. Protective film 502 shown in the figure is the optical film of the present invention.

The following effects are produced by producing a long wound optical film of less thickness and increased width via the production method of the present invention utilizing any of the production apparatuses shown in FIG. 1-FIG. 5:

1. A longer roll of an optical film of less thickness and increased width was realized, resulting in enhanced production efficiency, whereby it became possible to respond to larger screens of LCDs and an increased demand for such LCDs.

2. Sticking over time and a convex defect during storage tend not to occur, resulting in an increase in non-defective ratio to enhance production efficiency.

A resin used for an optical film according to the present invention will now be described. As the resin used for the optical film, a resin, being transparent and exhibiting excellent physical, mechanical properties and less dimensional variation against temperature and humidity changes, is used. There are listed, for example, a cellulose resin, a polycarbonate resin, a polyarylate resin, a polysulfone resin, a polyether sulfone resin, a norbornene resin, a polystyrene resin, a polyacrylate resin, and a polyester resin. Of these resins, a cellulose ester resin has preferably been used, and then this resin is described below.

A cellulose ester resin used in production of the film of the present invention is preferably a lower fatty acid ester resin of cellulose. The lower fatty acid in the lower fatty acid ester of cellulose is preferably a fatty acid having at most 6 carbon atoms. Specifically preferable examples of the lower fatty acid ester of cellulose include, for example, cellulose acetate, cellulose propionate, and cellulose butyrate.

Further, in addition to the above, there can be used the mixed fatty acid eaters such as cellulose acetate propionate, cellulose acetate butyrate, or cellulose acetate propionate butyrate described in JP-A Nos. 10-45804 and 8-231761, and U.S. Pat. No. 2,319,052. Of these described above, as lower fatty acid esters of cellulose specifically preferably used, cellulose triacetate (hereinafter referred to as TAC) and cellulose acetate propionate are listed.

The number average molecular weight of a cellulose ester according to the present invention is preferably 70,000-250,000, more preferably 80,000-150,000, since mechanical strength is enhanced in the case of shaping, and appropriate dope viscosity is realized.

As a cellulose ester used for the present invention, preferable is a cellulose ester having at least one of an acetyl group and a propionyl group and simultaneously satisfying following Expressions (I) and (II), provided that the substitution degree of the acetyl group is X, and the substitution degree of the propionyl group is Y.

$$2.3 \leq X+Y \leq 3.0 \quad (I)$$

$$0 \leq X \leq 2.5 \quad (II)$$

Specifically preferable is a cellulose ester simultaneously satisfying especially following Expressions (III), (IV), and (V).

$$2.3 \leq X+Y \leq 2.85 \quad (III)$$

$$1.5 \leq X \leq 2.5 \quad (IV)$$

$$0.1 \leq Y \leq 1.0 \quad (V)$$

The substitution degree of the acyl group can be determined via a determination method specified by ASTM-D817-96.

Conventionally, in some cases, use of a cellulose ester of a substitution degree of less than 2.85 caused dimensional stability to decrease. In contrast, by employing the production method of the present invention, a film exhibiting excellent dimensional stability became able to be produced even when a cellulose ester of a relatively low substitution degree was used.

As the cellulose ester, a cellulose ester, synthesized from cotton linter and a cellulose ester synthesized from wood pulp, can be used individually or in combination. When any problem in peelability from a support or drum is thought to exist, a larger amount of the cellulose ester, synthesized from cotton linter and exhibiting enhanced peelability from the support or drum, is preferably used to increase productivity. When the cellulose ester synthesized from wood pulp is used together, from the viewpoint of producing an excellent effect on peelability, the cellulose ester synthesized from cotton linter preferably has a ratio of at least 40% by mass, more preferably at least 60% by mass; being, however, most preferably used individually.

As a solvent used to prepare a dope, any solvent which is capable of dissolving a cellulose ester can be used. When a solvent is incapable of dissolving the cellulose ester on its own, the solvent can be used in combination with another solvent, provided that dissolution is carried out via this combination. There is commonly used a mixed solvent of methylene chloride, which is a good solvent, and a poor solvent to a cellulose ester. And a mixed solvent containing a poor solvent at 4-30% by mass is preferably used.

Other usable good solvents include, for example, methylene chloride, methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, and nitroethane. However, as preferable organic solvents (namely good solvents), there are listed organic halogen compounds such as methylene chloride, dioxolane derivatives, methyl acetate, ethyl acetate, and acetone.

Poor solvents to a cellulose ester include, for example, alcohols having 1-8 carbon atoms such as methanol, ethanol, n-propanol, isopropanol, n-butanol, sec-butanol, or tert-butanol, methyl ethyl ketone, methyl isobutyl ketone, propyl acetate, monochlorobenzene, benzene, cyclohexane, tetrahydrofuran, methyl cellosolve, and ethylene glycol monomethyl ether. These poor solvents can be used individually or in appropriate combinations of at least 2 types.

Plasticizers usable for the present invention are not specifically limited. There can preferably be used phosphoric acid ester-based plasticizers, phthalic acid ester-based plasticizers, trimellitic acid ester-based plasticizers, pyromellitic acid ester-based plasticizers, glycolate-based plasticizers, citric acid ester-based plasticizers, and polyester-based plasticizers.

There can preferably be used triphenyl phosphate, tricresyl phosphate, cresyl diphenyl phosphate, octyl diphenyl phosphate, diphenyl biphenyl phosphate, trioctyl phosphate, or tributyl phosphate as a phosphoric acid ester-based plasticizer; diethyl phthalate, dimethoxyethyl phthalate, dimethyl phthalate, dioctyl phthalate, dibutyl phthalate, di-2-ethylhexyl phthalate, or butylbenzyl phthalate as a phthalic acid ester-based plasticizer; tributyl trimellitate, triphenyl trimellitate, or triethyl trimellitate as a trimellitic acid ester-based plasticizer; tetrabutyl pyromellitate, tetraphenyl pyromellitate, or tetraethyl pyromellitate as a pyromellitic acid ester-based plasticizer; triacetin, tributylin, ethylphthalyl ethyl glycolate, methylphthalyl ethyl glycolate, or butylphthalyl butyl glycolate as a glycol acid eater-based plasticizer; and triethyl citrate, tri-n-butyl citrate, acetyl triethyl citrate, acetyl tri-n-butyl citrate, or acetyl tri-n-(2-ethylhexyl) citrate as a citric acid ester-based plasticizer. As a polyester-based plasticizer, a copolymer of a dibasic acid such as an aliphatic dibasic acid, an alicyclic dibasic acid, or an aromatic dibasic acid with glycol can be used. The alicyclic dibasic acid is not specifically limited, and adipic acid, sebacic acid, phthalic acid, terephthalic acid, and 1,4-cyclohexyl dicarboxylic acid can be used.

As a glycol, ethylene glycol, diethylene glycol, 1,3-propylene glycol, 1,2-propylene glycol, 1,4-butylene glycol, 1,3-butylene glycol, or 1,2-butylene glycol can be used. These dibasic acids and glycols may be used individually or in combinations of at least 2 types. The molecular weight of a polyester is preferably in the range of 500-2000 in terms of the weight average molecular weight from the viewpoint of compatibility with a cellulose ester.

Further, in the present invention, plasticizers specifically featuring a vapor pressure of less than 1333 Pa at 200° C. are preferably used, being compounds which more preferably feature a vapor pressure of at most 666 Pa, and still more preferably feature a vapor pressure of 1-133 Pa. Such plasticizers exhibiting nonvolatility are not specifically limited, including, for example, arylene bis(diaryl phosphate), tricresyl phosphate, tri(2-ethylhexyl) trimellitate, and the above polyester-based plasticizers. These plasticizers can be used individually or in combinations of at least 2 types.

The amount of a plasticizer used is commonly 1-40% by mass, preferably 3-20% by mass, more preferably 4-15% by mass based on a cellulose ester in view of dimensional stability and processability. In the case of less than 3% by mass, a smooth cutting face is unachievable on slitting or punching, resulting in formation of many cutting chips.

An antioxidant or UV absorbent is preferably added in the film of the present invention. As the above antioxidant, a hindered phenol-based compound is preferably used, including 2,6-di-t-butyl-p-cresol, pentaerythrityl-tetrakis[3-(3,5-di-t-butyl-p-hydroxyphenyl)propionate], triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, 2,2-thio-diethylenebis[3-(3,5-di-t-butyl-4-hydroxyphenyl) propionate], octadecyl-3-(3,5-di-t-butyl-4-hydroxyphenyl) propionate, N,N'-hexamethylene-bis(3,5-di-t-butyl-4-hydroxy-hydrocinnamido), 1,3,5-trimethyl-2,4,6-tris(3,5-di-t-butyl-4-hydroxy-benzyl)

benzene, and tris-(3,5-di-t-butyl-4-hydroxybenzyl) isocyanurate. Of these, 2,6-di-t-butyl-p-cresol, pentaerythrityl-tetrakis[3-(3,5-di-t-butyl-4-hydroxyphenyl) propionate], and triethylene glycol-bis[3-(3-t-butyl-5-methyl-4-hydroxyphenyl) propionate] are specifically preferable. Further, for example, there may be used together a hydrazine-based metal deactivator such as N,N-bis[3-(3,5-di-t-butyl-4-hydroxyphenyl)propionyl]hydrazine or a phosphor-based processing stabilizer such as tris(2,4-di-t-butylphenyl)phosphite. The amount of such compounds added is preferably 1 ppm-1.0%, more preferably 10 ppm-1000 ppm by mass based on a cellulose ester.

Further, in addition to these, there may be added inorganic fine particles such as kaolin, talc, diatomaceous earth, quartz, calcium carbonate, barium sulfate, titanium oxide, or alumina, and a thermal stabilizer such as a salt of alkaline earth metal such as calcium or magnesium.

An optical film produced via the production method of the present invention can be used for a polarization plate and a liquid crystal display member due to its enhanced dimensional stability. In this case, to prevent a polarization plate or liquid crystal from deteriorating, an appropriate UV absorbent is preferably used.

As such a UV absorbent, there are preferably used those exhibiting excellent capability of absorbing UV radiation of a wave length of at most 370 nm, as well as absorbing visible light of a wavelength of at least 400 nm only to a minor extent from the viewpoint of enhanced liquid crystal display performance. Specifically, the transmittance at 380 nm is preferably less than 10%, specifically preferably less than 5%.

Specific examples of a UV absorbent preferably used include, for example, an oxybenzophenone-based compound, a benzotriazole-based compound, a salicylic acid ester-based compound, a benzophenone-based compound, a cyanoacrylate-based compound, a nickel complex salt-based compound, and a triazine-based compound. For example, the UV absorbents described in JP-A Nos. 10-182621 and 8-337574 are preferably used. The polymer UV absorbents described in JP-A Nos. 6-148430 and 12-273437 are also preferably used. Any of the UV absorbents described in JP-A No. 10-152568 is also added.

Of these UV absorbents, a benzotriazole-based UV absorbent and a benzophenone-based UV absorbent are listed as preferable UV absorbents. Specific examples of the benzotriazole-based absorbent will now be listed that by no means limit the scope of the present invention.

There are listed 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidemethyl)-5'-methylphenyl)benzotriazole, 2,2-methylenebis(4-(1,1,3,3,-tetramethylbutyl)-6-(2H-benzotriazole-2-yl) phenyl), 2-(2'-hydroxy-3'-tert-butyl-5'-methylphenyl)-5-chlorobenzotriazole, 2-(2H-benzotriazole-2-yl)-6-(straight chained or branched dodecyl)-4-methylphenyl (TINUVIN171, produced by Ciba Specialty Chemicals, Ltd.), and a mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl) phenyl]propionate (TINUVIN109, produced by Ciba Specialty Chemicals, Ltd.).

Specific examples of the benzophenone-based UV absorbent will now be listed that by no means limit the scope of the present invention. There are listed 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenylmethane).

In a method of adding such a UV absorbent, a UV absorbent dissolved in an organic solvent such as alcohol, methylene chloride, or dioxolane may be added in a dope, or the UV absorbent may directly be added in a dope composition. It is preferable that those such as inorganic powder insoluble in an organic solvent be dispersed in a mixture of an organic solvent and a cellulose ester resin using a dissolver or sand mill and then added in a dope. The amount of a UV absorbent used is preferably 0.1% by mass-2.5% by mass, more preferably 0.8% by mass-2.0% by mass in view of effects and transparency as the UV absorbent.

Further, fine particles as a matting agent may be added in a cellulose ester resin film to realize easy handling by preventing sticking of the film itself or providing slipping properties. Such fine particles include inorganic compound fine particles and organic compound fine particles. As the inorganic compound, there are preferable a silicon-containing compound, silicon dioxide, aluminum oxide, zirconium oxide, calcium carbonate, talc, clay, fired kaolin, fired calcium silicate, hydrated calcium silicate, aluminum silicate, magnesium silicate, and calcium phosphate. Of these, a silicon-containing inorganic compound and zirconium oxide are more preferable, but silicon dioxide is specifically preferably used, since turbidity of a cellulose ester layered film can be reduced.

Silicon dioxide fine particles include, for example, AEROSIL 200, 200V, 300, R972, R972V, R974, R976, R976S, R202, R812, R805, OX50, TT600, RY50, RX50, NY50, NAX50, NA50H, NA50Y, NX90, RY200S, RY200, RX200, R8200, RA200H, RA200HS, NA200Y, R816, R104, RY300, RX300, and R106 (produced by Aerosil Co., Ltd.). Of these, AEROSIL 200V and R972V are preferable from the viewpoint of controlling dispersibility and particle diameter.

As zirconium oxide fine particles, for example, commercially available products such as AEROSIL R976 or R811 (produced by Nihon Aerosil Co., Ltd.) can be used.

As organic compounds, for example, polymers such as silicone resins, fluorine resins, or acrylic resins are preferable. Of these, silicone resins are preferably used.

Of these above silicone resins, preferable are those featuring a three-dimensionally networked structure. There can be used commercially available products with trade names such as TOSPERL 103, 105, 108, 120, 145, 3120, and 240 (produced by Toshiba Silicones Co., Ltd.).

The primary average particle diameter of the fine particle of the present invention is preferably at most 20 nm, more preferably 5-16 nm, specifically preferably 5-12 nm, from the viewpoint of controlling haze to be reduced.

The apparent specific gravity of the fine particle is preferably at least 70 g/l, more preferably 90-200 g/l, specifically preferably 100-200 g/l. A larger apparent specific gravity is preferable, since a highly concentrated dispersion can be prepared, resulting in a more favorable state of haze or aggregates. Such a larger value is specifically preferable in cases in which a dope of a high solid concentration is prepared as performed in the present invention.

Silicon dioxide fine particles featuring a primary average particle diameter of at most 20 nm and an apparent specific gravity of at least 70 g/l can be prepared in such a manner that, for example, a mixture of vaporized silicon tetrachloride and hydrogen is burned in the air at 1000-1200° C. Further, there can be used commercially available products with trade names such as AEROSIL 200V or AEROSIL R972V (produced by Nihon Aerosil Co., Ltd.).

Herein, the apparent specific gravity was calculated by the following expression wherein a specific amount of silicon dioxide fine particles was collected in a measuring cylinder to measure this weight.

Apparent specific gravity (g/l)=mass of silicon dioxide (g)/volume of silicon dioxide (l)

Preparation methods of a dispersion of the fine particle of the present invention include, for example, 3 types as described below.

<<Preparation Method A>>

A solvent and a fine particle are mixed and dispersed using a homogenizer. The resulting product is designated as a fine particle dispersion. This fine particle dispersion is added in a dope liquid, followed by being stirred.

<<Preparation Method B>>

A solvent and a fine particle are mixed and dispersed using a homogenizer. The resulting product is designated as a fine particle dispersion. A small amount of a cellulose ester is added in a separate solvent, followed by being dissolved while stirring. As such a cellulose ester added in this case, the solid material of the present invention is specifically preferably added.

The above fine particle dispersion is added in the thus-prepared solution and stirred. The resulting product is designated as a fine particle added liquid. Then, this fine particle added liquid is thoroughly mixed with a dope liquid using an in-line mixer.

<<Preparation Method C>>

A small amount of a cellulose ester is added in a solvent, followed by being dissolved while stirring. A fine particle is added in the resulting solution and dispersed using a homogenizer. The resulting product is designated as a fine particle added liquid. Then, this fine particle added liquid is thoroughly mixed with a dope liquid using an in-line mixer.

Preparation method A features enhanced dispersibility with respect to silicon dioxide fine particles, and preparation method C has an advantage such that silicon dioxide fine particles are hardly reaggregated. Of these, above preparation method B is a preferable method, since this method has both of the excellent features: namely, enhanced dispersibility of silicon dioxide is realized and silicon dioxide fine particles are hardly reaggregated.

<<Dispersion Method>>

When a mixture of silicon dioxide fine particles and a solvent is dispersed, the concentration of silicon dioxide is preferably 5-30% by mass, more preferably 15-25% by mass, most preferably 15-20% by mass. A higher dispersion concentration is preferable, since liquid turbidity against the added amount tends to decrease, resulting in a more favorable state of haze or aggregates.

The solvent used includes, as lower alcohols, preferably methyl alcohol, ethyl alcohol, propyl alcohol, and butyl alcohol. Solvents other than lower alcohols are not specifically limited, and any appropriate solvents used in film production of a cellulose ester are preferably employed.

The amount of silicon dioxide fine particles added to a cellulose ester is preferably 0.01-0.3 part by mass, more preferably 0.05-0.2 part by mass, most preferably 0.08-0.12 part by mass, based on 100 parts of the cellulose ester. A larger added amount thereof results in more favorable dynamic friction coefficient. In contrast, a smaller added amount results in reduced haze and less aggregates.

As a homogenizer, any common homogenizers are usable. Homogenizers are classified roughly into two categories: a media homogenizer and a medialess homogenizer. To disperse silicon dioxide fine particles, a media homogenizer is preferably used due to reduced haze.

The media homogenizer includes a ball mill, a sand mill, and a dyno mill.

The medialess homogenizer includes an ultrasonic type, a centrifugal type, and a high pressure type. In the present invention, the high pressure homogenizer is preferable. The high pressure homogenizer is an apparatus which generates special conditions such as high shearing or high pressure by passing a composition prepared by mixing fine particles with a solvent into a narrow pipe at high velocity. In cases of treatment using a high pressure homogenizer, for example, in a narrow pipe of a pipe diameter of 1-2000 μm, the maximum pressure condition in the interior of the apparatus is preferably at least 9.807 MPa, more preferably at least 19.613 MPa. Further, in this case, preferable is an apparatus which allows the maximum attainable velocity to be at least 100 m/second, as well as the heat transfer rate to be at least 420 kJ/hour.

The above high pressure homogenizer includes an ultra-high pressure homogenizer (a trade name of MICROFLUIDIZER, produced by Microfluidics Corp.) and NANOMIZER (produced by Nanomizer Co., LTD.), and additionally including a Manton-Gaulin type high pressure homogenizer such as a homogenizer produced by Izumi Food Machinery Co., Ltd. or UHN-01 produced by Sanwa Engineering Ltd.

Further, these fine particles may uniformly be distributed in the film thickness direction, but are preferably distributed so as to be present near the surface. For example, employing 2 types of dopes via a co-casting method, fine particles are preferably added in the dope arranged on the surface layer side, since a film exhibiting enhanced slipping properties and reduced haze is produced. Using 3 types of dopes, fine particles are more preferably added mainly in 2 types thereof on the surface layer side.

A conductive material is also added in the film of the present invention to produce an optical film exhibiting preferable impedance. Such a conductive material is not specifically limited, and there can be used ion conductive materials, conductive fine particles, or antistatic agents exhibiting compatibility with a cellulose ester.

Herein, these ion conductive materials refer to materials exhibiting electrical conductivity and containing ions being carriers transporting electricity, including, for example, ionic polymers.

The ionic polymers include anionic polymers as described in Examined Japanese Patent Application Publication (hereinafter referred to as JP-B) Nos. 49-23828, 49-23827, and 47-28937; ionene-type polymers having a dissociable group in a main chain as described, for example, in JP-B No. 55-734, JP-A No. 50-54672, JP-B Nos. 59-14735, 57-18175, 57-18176, and 57-56059; and cationic pendant-type polymers having a cationic dissociable group in a side chain as described in JP-B Nos. 53-13223, 57-15376, 53-45231, 55-145783, 55-65950, 55-67746, 57-11342, 57-19735, and 58-56858, as well as JP-A Nos. 61-27853 and 62-9346.

Further, examples of conductive fine particles include metal oxides exhibiting electrical conductivity. As examples of these metal oxides, preferable are $ZnO$, $TiO_2$, $SnO_2$, $Al_2O_3$, $In_2O_3$, $SiO_2$, $MgO$, $BaO$, $MoO_2$, and $V_2O_5$, or composite oxides thereof. Of these, $ZnO$, $TiO_2$, and $SnO_2$ are specifically preferable. With regard to examples of incorporation of a heterogeneous atom, it is effective that Al or In is added to $ZnO$; Nb or Ta is added to $TiO_2$; or Sb, Nb, or a halogen element is added to $SnO_2$. The added amount of these heterogeneous atoms is preferably in the range of 0.01-25 mol %, specifically preferably in the range of 0.1-15 mol %.

The volume resistivity of such metal oxide powders exhibiting electrical conductivity is at most $10^7$ Ωcm, specifically preferably at most $10^5$ Ωcm. It is preferable to incorporate a powder, featuring a primary particle diameter of 10 nm-0.2 μm and a specified structure such that the major axis in a higher-order structure is 30 nm-6 μm, in a partial region of the film in the range of 0.01%-20% in terms of the volume fraction.

It is specifically preferably to incorporate an ionene conductive polymer as described in JP-A No. 9-203810 or a quaternary ammonium cationic conductive polymer having intermolecular crosslinks.

Features of a crosslinking-type cationic conductive polymer exist in a dispersible particulate polymer produced, which can be allowed to have a cationic component in a particle at high concentration and density, resulting in enhanced electrical conductivity. Further, no decrease in electrical conductivity is noted even at a lower relative humidity. And also, in spite of enhanced dispersion of the particle itself in a dispersion state, enhanced self-adhesion during film forming processing after coating is realized, resulting in enhanced film strength, as well as excellent adhesion to another material such as a substrate, leading to enhanced chemical resistance.

The particle size of such a dispersible particulate polymer, being a crosslinking-type cationic conductive polymer, is commonly about 0.01 μm-0.3 μm, and a polymer of a particle size of 0.05 μm-0.15 μm is preferably employed. The term "dispersible particulate polymer" referred to in this case represents a polymer which appears to be a transparent or slightly cloudy solution via visual observation, but to be a particulate dispersion under an electron microscope.

An antistatic agent or matting agent added is preferably contained in the surface layer portion (a portion up to 10 μm from the surface). It is preferable to incorporate at least one of an antistatic agent and a matting agent in the film surface portion via a method such as co-casting. Specifically, using dope A containing at least one of a conductive material and a matting agent and dope B substantially not containing any of these, casting is preferably carried out so as for dope A to be allowed to be present on at least one side of dope B.

An antistatic agent, flame retardant, slipping agent, oil, matting agent, or other additives may further be added, if appropriate.

An optical film produced via the production method of the present invention can be employed for polarization plates used for liquid crystal displays, as well as for a base material for use in antireflection films or optical compensation films used for liquid crystal displays.

EXAMPLES

The present invention will now specifically be described with reference to examples that by no means limit the scope of the present invention.

Example 1

| (Preparation of Dope Composition) | |
|---|---|
| Cellulose triacetate propionate (acetyl substitution degree: 1.95; propionyl substitution degree: 0.7) | 100 parts by mass |
| Triphenyl phosphate | 10 parts by mass |
| Ethylphthalyl ethyl glycolate | 2 parts by mass |
| TINUVIN 326 (produced by Ciba Specialty Chemicals, Ltd.) | 1 part by mass |
| AEROSIL 200V (produced by Nihon Aerosil Co., Ltd.) | 0.1 part by mass |
| Methylene chloride | 300 parts by mass |
| Ethanol | 40 parts by mass |

The above materials were sequentially placed in a sealed container and the temperature in the container was raised from 20° C. to 80° C., followed by stirring for 3 hours while the temperature was kept at 80° C. to completely dissolve these materials. Then, stirring was terminated and the liquid temperature was decreased to 43° C. to give a dope via filtration using filter paper (Azumi Filter Paper No. 244, produced by Azumi Filterpaper Co., Ltd.).

(Production of Cellulose Triacetate Propionate Film)

Employing the process shown in FIG. 1, a cellulose triacetate propionate film was produced as follows. Namely, the thus-prepared dope was cast on a stainless steel endless support belt from a casting dice at 33° C. so as for width to vary as shown in Table 1. Then, using the heating apparatuses shown in FIG. 3 and FIG. 4, the dope was heated under different heating conditions for the edge portions of both sides and the center portion thereof in the anterior portion and the posterior portion of the belt as shown in Table 1. A web having been formed on the belt was peeled therefrom and stretched in the stretching process. Then, the web was conveyed at a conveyance rate of 50 m/minute and dried at 100° C. for 20 minutes. In this manner, cellulose triacetate propionate films of a thickness of 80 μm each having a length of 5000 m were produced, and thereafter wound on a winding core in the winding process as roll cellulose triacetate propionate films, which were designated as sample Nos. 101-118. Of these, sample Nos. 101-103 are comparative examples with an excessively small dope width, while sample Nos. 116-118 are comparative examples with an excessively large dope width. Herein, the heating temperatures of the edge portions of the both sides and the center portion are values based on indicated values of the apparatuses. These indicated values were calibrated using a commercially available normal thermometer. The calibration method is not limited to any specific method. In this case, 3-point calibration was carried out. Further, each of the edge portions of the both sides ranged from its corresponding edge as the reference point to 30% of the total dope width.

TABLE 1

| Sample No. | Width of Dope Cast on Belt (mm) | Heating Temperature (° C.) of Belt Anterior Portion | | Heating Temperature (° C.) of Belt Posterior Portion | | Remarks |
|---|---|---|---|---|---|---|
| | | Both Side Edge Portions | Center Portion | Both Side Edge Portions | Center Portion | |
| 101 | 1300 | 55 | 65 | 55 | 45 | Comparative |
| 102 | 1300 | 60 | 60 | 50 | 50 | Comparative |
| 103 | 1300 | 65 | 55 | 45 | 55 | Comparative |
| 104 | 1500 | 55 | 65 | 55 | 45 | Inventive |
| 105 | 1500 | 60 | 60 | 50 | 50 | Comparative |
| 106 | 1500 | 65 | 55 | 45 | 55 | Comparative |
| 107 | 2000 | 55 | 65 | 55 | 45 | Inventive |

TABLE 1-continued

| Sample No. | Width of Dope Cast on Belt (mm) | Heating Temperature (° C.) of Belt Anterior Portion | | Heating Temperature (° C.) of Belt Posterior Portion | | Remarks |
|---|---|---|---|---|---|---|
| | | Both Side Edge Portions | Center Portion | Both Side Edge Portions | Center Portion | |
| 108 | 2000 | 60 | 60 | 50 | 50 | Comparative |
| 109 | 2000 | 65 | 55 | 45 | 55 | Comparative |
| 110 | 3000 | 55 | 65 | 55 | 45 | Inventive |
| 111 | 3000 | 60 | 60 | 50 | 50 | Comparative |
| 112 | 3000 | 65 | 65 | 45 | 55 | Comparative |
| 113 | 4000 | 55 | 65 | 55 | 45 | Inventive |
| 114 | 4000 | 60 | 60 | 50 | 50 | Comparative |
| 115 | 4000 | 65 | 55 | 45 | 55 | Comparative |
| 116 | 4500 | 55 | 65 | 55 | 45 | Comparative |
| 117 | 4500 | 60 | 60 | 50 | 50 | Comparative |
| 118 | 4500 | 65 | 55 | 45 | 55 | Comparative |

Evaluation

With regard to each of sample Nos. 101-118 produced, the amount of a plasticizer present in the center portion and edge portions of both sides of each of the samples was determined via TOF-SIMS employing a method describes below, and also determination of dynamic friction coefficient, determination of elongation and contraction rate, as well as observation of sticking presence or absence, and observation of convex defect presence or absence were carried out. Table 2 shows the results from these evaluations based on evaluation ranking to be described later.

Determination of the Amount of a Plasticizer Present in the Edge Portions of Both Edges and the Center Portion Via TOF-SIMS As a measurement instrument, TFS-2100 (produced by Physical Electronics, Inc.) was used. Each of the thickness cross sections of the center portion and edge portions of a specimen was scanned by TOF-SIMS at a temperature of 23° C. and a relative humidity of 55%, and then the number of counts of a mass value attributing to a plasticizer contained in the film was continuously measured from the front surface side to the rear surface side in the thickness cross section. The other conditions were based on the operational method shown for the instrument. Herein, as the above specimen, a specimen of a total width of 50 cm was collected from a 5000 m long roll optical film at a point 5 m from the winding outer side. With regard to measurement locations, a portion sandwiched by edge portions each located at a point 200 mm from the width center was designated as the center portion, and potions each ranging up to 200 mm from the both edges were designated as the edge portions.

(Determination Method of Value X)

A thickness cross section in the center portion of a specimen is scanned by TOF-SIMS, and then the number of counts of a mass value attributing to a plasticizer contained in the cellulose acetate propionate film was continuously measured 3 times from the front surface side to the rear surface side in the thickness cross section. The number of counts from the front surface side to the rear surface side is graphed to show distribution of the plasticizer, and the number of counts on the front surface side is designated as A and the number of counts on the rear surface side is designated as B. Value X was obtained from A and B by the expression of X={A/(A+B)}×100. Value X represents the average value obtained via measurement of 3 times by TOF-SIMS.

(Determination of Value X')

A thickness cross section in each of the edge portions of both sides of a specimen is scanned by TOF-SIMS, and then the number of counts of a mass value attributing to a plasticizer contained in the cellulose acetate propionate film was continuously measured from the front surface side to the rear surface side in the thickness cross section. The number of counts from the front surface side to the rear surface side is graphed to show distribution of the plasticizer, and the number of counts on the front surface side is designated as A' and the number of counts on the rear surface side is designated as B'. Value X' was obtained from A' and B' by the expression of X'={A'/(A'+B')}×100. Value X represents the average value obtained via measurement of 3 times by TOF-SIMS.

Determination of Dynamic Friction Coefficient

Using a friction tester (produced by Tester Sangyo Co., Ltd.), a specimen was measured with a load of 300 g at a measurement rate of 100 mm/minute at a temperature of 23° C. and a relative humidity of 55%, with the other conditions based on JIS K-7125. A dynamic friction coefficient refers to a value obtained by dividing an obtained dynamic friction resistance force by a load during measurement, being represented by the average value based on the number of times of measurement. Herein, the specimens used each having a total width of 50 cm were collected at a point 10 m from the winding core side or at a point 10 m from the winding outer side. With regard to measurement locations, a portion (center portion) sandwiched by two points 200 mm from the width center point, as well as portions (edge portions) ranging up to 200 mm from the both edges were measured 3 times.

Determination of Elongation and Contraction Rate

A specimen of a size of 20 cm×20 cm was collected at a point 10 m from the winding outer side. Specified marks with a distance of 100 mm were placed thereon both in the MD direction and in the TD direction. Then, the specimen was allowed to stand in a thermo-hygrostat at a temperature of 30° C. and a relative humidity of 80% for 7 days. The lengths of the original distance of 100 mm with the specified marks were measured using a microscope-type two-point distance measurement instrument to determine MD elongation and contraction rate, as well as TD elongation and contraction rate via calculation based on expressions shown below. Length measurement was carried out after at least 24 hour standing at 23° C. and 55% RH after and prior to the above treatment. As the thermo-hygrostat, Type PR-2 (produced by Espec Corp.) was used.

MD elongation and contraction rate=(length in MD direction after treatment−length in MD direction prior to treatment)/length in MD direction prior to treatment×100

TD elongation and contraction rate=(length in TD direction after treatment−length in TD direction prior to treatment)/length in TD direction prior to treatment×100

Herein, a length in the MD (Machine Direction) direction represents a length in the longitudinal direction, and a length in the TD (Transverse Direction) direction represents a length in the lateral direction.

Confirmation of Sticking

A roll sample of 5000 m was rewound on a separate winding core, and the presence or absence of sticking was visually observed.

Evaluation Ranking of Sticking

A: No sticking was confirmed from the winding initiation point to the winding termination point.

B: Weak sticking, being not practically problematic, was noted at several locations from the winding initiation point to a point about 2500 m therefrom.

C: Sticking was frequently confirmed from the winding initiation point to the winding termination point.

Observation of Convex Defects

A roll sample of 5000 m was rewound on a separate winding core, and the presence or absence of a convex defect was visually observed.

Evaluation Ranking of Convex Defects

A: No convex defect is confirmed from the winding initiation point to the winding termination point.

B: Several minor convex defects, being not practically problematic, are noted from the winding initiation point to a point 2500 m therefrom.

C: Convex defects are frequently confirmed from the winding initiation point to the winding termination point.

Example 2

Preparation of Dope Composition

A dope, which was the same as in Example 1, was prepared.

(Production of Cellulose Triacetate Propionate Film)

Employing the process shown in FIG. 2(a), a cellulose triacetate propionate film was produced via a method as follows. The thus-prepared dope was cast on a stainless steel endless support belt from a casting dice at 33° C. at a width of 1800 mm. Using the heating apparatuses shown in FIG. 3 and FIG. 4, the dope was heated under different heating conditions for the edge portions of both sides and the center portion

TABLE 2

| Sample No. | TOF-SIMS Center Portion X | TOF-SIMS Edge Portion 1 X' | TOF-SIMS Edge Portion 2 X' | Dynamic Friction Coefficient Ratio* | Elongation and Contraction Rate (%) MD | Elongation and Contraction Rate (%) TD | Sticking | Convex Defect | Remarks |
|---|---|---|---|---|---|---|---|---|---|
| 101 | 30 | 45 | 45 | 1.03 | 0.08 | 0.08 | A | A | Comparative |
| 102 | 35 | 35 | 35 | 1.07 | 0.14 | 0.14 | C | C | Comparative |
| 103 | 45 | 30 | 30 | 0.94 | −0.11 | −0.11 | C | C | Comparative |
| 104 | 30 | 45 | 45 | 1.03 | 0.08 | 0.08 | A | A | Inventive |
| 105 | 35 | 35 | 35 | 1.07 | 0.14 | 0.14 | C | C | Comparative |
| 106 | 45 | 30 | 45 | 0.94 | −0.11 | −0.11 | C | C | Comparative |
| 107 | 30 | 45 | 45 | 1.03 | 0.08 | 0.08 | A | A | Inventive |
| 108 | 35 | 35 | 35 | 1.07 | 0.14 | 0.14 | C | C | Comparative |
| 109 | 45 | 30 | 30 | 0.94 | −0.11 | −0.11 | C | C | Comparative |
| 110 | 30 | 45 | 45 | 1.03 | 0.08 | 0.08 | A | A | Inventive |
| 111 | 35 | 35 | 35 | 1.07 | 0.14 | 0.14 | C | C | Comparative |
| 112 | 45 | 30 | 45 | 0.94 | −0.11 | −0.11 | C | C | Comparative |
| 113 | 30 | 45 | 45 | 1.03 | 0.08 | 0.08 | A | A | Inventive |
| 114 | 35 | 35 | 35 | 1.07 | 0.14 | 0.14 | C | C | Comparative |
| 115 | 45 | 30 | 30 | 0.94 | −0.11 | −0.11 | C | C | Comparative |
| 116 | 30 | 45 | 45 | 1.03 | 0.08 | 0.08 | A | A | Comparative |
| 117 | 35 | 35 | 35 | 1.07 | 0.14 | 0.14 | C | C | Comparative |
| 118 | 45 | 30 | 45 | 0.94 | −0.11 | −0.11 | C | C | Comparative |

A dynamic friction coefficient ratio* represents a ratio of the dynamic friction coefficient of an optical film on the winding outer side to the dynamic friction coefficient thereof on the winding core side. Edge portion 1 represents an edge portion on the right side of the cellulose triacetate propionate film in the MD direction, and edge portion 2 represents an edge portion on the left side. Sample No. 101 had the same evaluation result as the samples of the present invention. However, due to its relatively small width, no response to increased width is made, resulting in no response to larger image screen sizes which are being demanded on the market. Sample No. 116 also had the same evaluation result as the samples of the present invention. However, due to its relatively large width, larger peripheral devices, as well as excessive man-hours and cost for maintenance were thought to be needed, whereby sample No. 116 was judged to be practically unviable. Thus, the effectiveness of the present invention was confirmed.

thereof in the anterior portion and the posterior portion of the belt as shown in Table 3. A web having been formed on the belt was peeled therefrom and dried at 50° C. for 5 minutes in the first drying process, followed by stretching in the stretching process. Then, the web was conveyed at a conveyance rate of 50 m/minute and dried at 100° C. for 20 minutes in the second drying process. In this manner, cellulose triacetate propionate films of a thickness of 80 μm each having a length of 3000 m were produced, and thereafter wound on a winding core in the winding process as roll cellulose triacetate propionate films which were designated as sample Nos. 201-214. Herein, the heating temperatures of the edge portions of the both sides and the center portion are values based on indicated values of the apparatuses. These indicated values were calibrated using a commercially available normal thermometer. The calibration method was preformed via 3-point calibration. Further, each of the edge portions of the both sides ranged from its corresponding edge as the reference point to 30% of the total dope width.

TABLE 3

| Sample No. | Heating Temperature of Belt Anterior Portion (° C.) ||| Heating Temperature of Belt Posterior Portion (° C.) |||
|---|---|---|---|---|---|---|
| | Both Side Edge Portions | Center Portion | Center Portion Heating Temperature − Both Edge Portion Heating Temperature (° C.) | Both Side Edge Portions | Center Portion | Center Portion Heating Temperature − Both Edge Portion Heating Temperature (° C.) |
| 201 | 59.5 | 60 | 0.5 | 55 | 50 | 5 |
| 202 | 59 | 60 | 1 | 55 | 50 | 5 |
| 203 | 55 | 60 | 5 | 55 | 50 | 5 |
| 204 | 55 | 65 | 10 | 55 | 50 | 5 |
| 205 | 55 | 65 | 15 | 55 | 50 | 5 |
| 206 | 50 | 70 | 20 | 55 | 50 | 5 |
| 207 | 50 | 72 | 22 | 55 | 50 | 5 |
| 208 | 55 | 60 | 5 | 50.5 | 50 | 0.5 |
| 209 | 55 | 60 | 5 | 51 | 50 | 1 |
| 210 | 55 | 60 | 5 | 55 | 50 | 5 |
| 211 | 55 | 60 | 5 | 55 | 45 | 10 |
| 212 | 55 | 60 | 5 | 60 | 45 | 15 |
| 213 | 55 | 60 | 5 | 60 | 40 | 20 |
| 214 | 55 | 60 | 5 | 62 | 40 | 22 |

Evaluation

With regard to each of sample Nos. 201-214 produced, the amount of a plasticizer present in the center portion and edge portions of both sides of each of the samples was determined via TOF-SIMS employing the same method as in Example 1, and also determination of dynamic friction coefficient, determination of elongation and contraction rate, as well as observation of sticking presence or absence, and observation of convex defect presence or absence were carried out. Table 4 shows the results from these evaluations based on the same evaluation ranking as in Example 1.

TABLE 4

| Sample No. | TOF-SIMS ||| Dynamic Friction Coefficient Ratio* | Elongation and Contraction Rate (%) || Sticking | Convex Defect |
|---|---|---|---|---|---|---|---|---|
| | Center Portion X | Edge Portion 1 X' | Edge Portion 2 X' | | MD | TD | | |
| 201 | 35 | 35 | 35 | 1.07 | 0.14 | 0.14 | B | B |
| 202 | 34 | 37 | 37 | 1.04 | 0.09 | 0.09 | A | A |
| 203 | 32 | 40 | 40 | 1.04 | 0.09 | 0.09 | A | A |
| 204 | 30 | 45 | 45 | 1.03 | 0.08 | 0.08 | A | A |
| 205 | 28 | 47 | 47 | 1.02 | 0.05 | 0.05 | A | A |
| 206 | 25 | 49 | 49 | 1.01 | 0.04 | 0.04 | A | A |
| 207 | 15 | 55 | 55 | 0.94 | −0.11 | −0.11 | B | B |
| 208 | 35 | 35 | 35 | 1.07 | 0.14 | 0.14 | B | B |
| 209 | 34 | 37 | 37 | 1.04 | 0.09 | 0.09 | A | A |
| 210 | 32 | 40 | 40 | 1.04 | 0.09 | 0.09 | A | A |
| 211 | 30 | 45 | 45 | 1.03 | 0.08 | 0.08 | A | A |
| 212 | 28 | 47 | 47 | 1.02 | 0.05 | 0.05 | A | A |
| 213 | 25 | 49 | 49 | 1.01 | 0.04 | 0.04 | A | A |
| 214 | 15 | 55 | 55 | 0.94 | −0.11 | −0.11 | B | B |

A dynamic friction coefficient ratio represents a ratio of the dynamic friction coefficient of a cellulose triacetate propionate film on the winding outer side to the dynamic friction coefficient thereof on the winding core side. Edge portion 1 represents an edge portion on the right side of the cellulose triacetate propionate film in the MD direction, and edge portion 2 represents an edge portion on the left side. The effectiveness of the present invention was confirmed.

Example 3

Preparation of Dope Composition

A dope, which was the same as in Example 1, was prepared.

(Production of Cellulose Triacetate Propionate Film)

Employing the process shown in FIG. 2(*a*), a cellulose triacetate propionate film was produced via a method as follows. The thus-prepared dope was cast on a stainless steel endless support belt from a casting dice at 33° C. at a width of 2000 mm. Using the heating apparatuses shown in FIG. 3 and FIG. 4, the dope was heated wherein the width of the edge portions of both sides thereof in the anterior portion and the posterior portion of the belt was changed as shown in Table 5. A web having been formed on the belt was peeled therefrom and dried at 50° C. for 5 minutes in the first drying process, followed by stretching in the stretching process. Then, the web was conveyed at a conveyance rate of 50 m/minute and dried at 100° C. for 20 minutes in the second drying process. In this manner, cellulose triacetate propionate films of a thickness of 80 μm each having a length of 3000 m were produced, and thereafter wound on a winding core in the winding process as roll cellulose triacetate propionate films which were designated as sample Nos. 301-306. Herein, the heating temperature of the edge portions of both sides in the anterior portion, and that of the center portion were 55° C. and 65° C., respectively, while the heating temperature of the edge portions of both sides in the posterior portion, and that of the center portion were 55° C. and 45° C., respectively. Incidentally, the heating temperatures of the edge portions of the both sides and the center portion are values based on indicated values of the apparatuses. These indicated values were calibrated using a commercially available normal thermometer. The calibration method was preformed via 3-point calibration. Each of the edge portions of the both sides represents a ratio (%) to the total dope width when viewed from its corresponding edge as the reference point.

TABLE 5

| Sample No. | Width of Both Side Edge Portions in Belt Anterior Portion (%) | Width of Both Side Edge Portions in Belt Posterior Portion (%) |
| --- | --- | --- |
| 301 | 8 | 8 |
| 302 | 10 | 10 |
| 303 | 20 | 20 |
| 304 | 30 | 30 |
| 305 | 40 | 40 |
| 306 | 45 | 45 |

Evaluation

With regard to each of sample Nos. 301-306 produced, the amount of a plasticizer present in the center portion and edge portions of each of the samples was determined via TOF-SIMS employing the same method as in Example 1, and also determination of dynamic friction coefficient, determination of elongation and contraction rate, as well as observation of sticking presence or absence, and observation of convex defect presence or absence were carried out. Table 6 shows the results from these evaluations based on the same evaluation ranking as in Example 1.

A dynamic friction coefficient ratio* represents a ratio of the dynamic friction coefficient of a cellulose triacetate propionate film on the winding outer side to the dynamic friction coefficient thereof on the winding core side. Edge portion 1 represents an edge portion on the right side of the cellulose triacetate propionate film in the MD direction, and edge portion 2 represents an edge portion on the left side. The effectiveness of the present invention was confirmed.

Example 4

Preparation of Dope Composition

A dope, which was the same as in Example 1, was prepared.

(Production of Cellulose Triacetate Propionate Film)

Using the prepared dope, via the process shown in FIG. 1, cellulose triacetate propionate films were produced under the same conditions as for sample No. 104 of Example 1 except that the winding length was changed as shown in Table 7 to obtain sample Nos. 401-407.

Evaluation

With regard to each of sample Nos. 401-407 produced, the amount of a plasticizer present in the center portion and edge portions of each of the samples was determined via TOF-SIMS employing the same method as in Example 1, and also determination of dynamic friction coefficient, determination of elongation and contraction rate, as well as observation of sticking presence or absence, and observation of convex defect presence or absence were carried out. Table 7 shows the results from these evaluations based on the same evaluation ranking as in Example 1.

TABLE 6

| Sample No. | TOF-SIMS | | | Dynamic Friction Coefficient Ratio* | Elongation and Contraction Rate (%) | | Sticking | Convex Defect |
| --- | --- | --- | --- | --- | --- | --- | --- | --- |
| | Center Portion X | Edge Portion 1 X' | Edge Portion 2 X' | | MD | TD | | |
| 301 | 30 | 55 | 55 | 0.94 | −0.11 | −0.11 | B | B |
| 302 | 30 | 45 | 45 | 1.03 | 0.08 | 0.08 | A | A |
| 303 | 30 | 45 | 45 | 1.03 | 0.08 | 0.08 | A | A |
| 304 | 30 | 45 | 45 | 1.03 | 0.08 | 0.08 | A | A |
| 305 | 30 | 45 | 45 | 1.03 | 0.08 | 0.08 | A | A |
| 306 | 35 | 35 | 35 | 1.07 | 0.14 | 0.14 | B | B |

TABLE 7

| Sample No. | Winding Length (m) | TOF-SIMS Center Portion X | TOF-SIMS Edge Portion 1 X' | TOF-SIMS Edge Portion 2 X' | Dynamic Friction Coefficient Ratio* | Elongation and Contraction Rate (%) MD | Elongation and Contraction Rate (%) TD | Sticking | Convex Defect |
|---|---|---|---|---|---|---|---|---|---|
| 401 | 1300 | 30 | 45 | 45 | 1.03 | 0.08 | 0.08 | A | A |
| 402 | 1500 | 30 | 45 | 45 | 1.03 | 0.08 | 0.08 | A | A |
| 403 | 3000 | 30 | 45 | 45 | 1.03 | 0.08 | 0.08 | A | A |
| 404 | 5000 | 30 | 45 | 45 | 1.03 | 0.08 | 0.08 | A | A |
| 405 | 8000 | 30 | 45 | 45 | 1.03 | 0.08 | 0.08 | A | A |
| 406 | 10000 | 30 | 45 | 45 | 1.03 | 0.08 | 0.08 | A | A |
| 407 | 11000 | 30 | 45 | 45 | 1.03 | 0.08 | 0.08 | A | A |

A dynamic friction coefficient ratio* represents a ratio of the dynamic friction coefficient of a cellulose triacetate propionate film on the winding outer side to the dynamic friction coefficient thereof on the winding core side. Edge portion 1 represents an edge portion on the right side of the cellulose triacetate propionate film in the MD direction, and edge portion 2 represents an edge portion on the left side. Sample No. 401 insufficiently responds to enhanced productivity due to its relatively small winding length, while sample No. 407 is difficult to handle due to its relatively long winding length. Thus, the effectiveness of the present invention was confirmed.

Example 5

| (Preparation of Dope Composition) | |
|---|---|
| Cellulose triacetate (acetyl substitution degree: 2.88) | 100 parts by mass |
| Triphenyl phosphate | 10 parts by mass |
| Ethylphthalyl ethyl glycolate | 2 parts by mass |
| TINUVIN 326 (produced by Ciba Specialty Chemicals, Ltd.) | 1 part by mass |
| AEROSIL 200V (produced by Nihon Aerosil Co., Ltd.) | 0.1 part by mass |
| Methylene chloride | 300 parts by mass |
| Ethanol | 40 parts by mass |

The above materials were sequentially placed in a sealed container and the temperature in the container was raised from 20° C. to 80° C., followed by stirring for 3 hours while the temperature was kept at 80° C. to completely dissolve these materials. Then, stirring was terminated and the liquid temperature was decreased to 43° C. to give a dope via filtration using filter paper (Azumi Filter Paper No. 244, produced by Azumi Filterpaper Co., Ltd.).

(Production of Cellulose Triacetate Film)

Employing the process shown in FIG. 1, a cellulose triacetate film was produced as follows. Namely, the thus-prepared dope was cast on a stainless steel endless support belt from a casting dice at 33° C. so as for width to vary as shown in Table 8. Then, using the heating apparatuses shown in FIG. 3 and FIG. 4, the dope was heated under different heating conditions for the edge portions of both sides and the center portion thereof in the anterior portion and the posterior portion of the belt as shown in Table 9. A web having been formed on the belt was peeled therefrom and stretched in the stretching process, followed by drying. Then, cellulose triacetate films, to be designated as sample Nos. 501-550, were produced with varied value X and value X' as shown in Table 8, wherein value X was calculated by an expression to be described later from value A obtained by determining the amount of a plasticizer present in the center portion on the front surface side (hot air blowing side) of the produced cellulose triacetate film via TOF-SIMS and value B obtained by determining the amount of a plasticizer present in the center portion on the rear surface side (belt contacting side) via TOF-SIMS, and value X' was calculated by an expression to be described later from value A' obtained by determining the amount of a plasticizer present in an edge portion on the front surface side (hot air blowing side) via TOF-SIMS and value B' obtained by determining the amount of a plasticizer present in an edge portion on the rear surface side (belt contacting side) via TOF-SIMS. Herein, the conveyance rate was 50 m/minute, and drying was carried out at 100° C. for 20 minutes.

Determination of the amount of a plasticizer via TOF-SIMS was carried out employing each of the methods described below. A specimen of 50 cm long was collected at a point 10 m inward from the termination edge of a produced sample of 5000 m.

(Determination in the Center Potion)

Value X was calculated by the following expression from value A obtained by determining the amount of a plasticizer present in the center portion on the front surface side (hot air blowing side) of the specimen via TOF-SIMS and value B obtained by determining the amount of a plasticizer present in the center portion on the rear surface side (belt contacting side) via TOF-SIMS.

$$X = \{A/(A+B)\} \times 100$$

(Determination in an Edge Portion)

Value X' is calculated by the following expression from value A' obtained by determining the amount of a plasticizer present in an edge portion (on either side) on the front surface side (hot air blowing side) via TOF-SIMS and value B' obtained by determining the amount of a plasticizer present in an edge portion (on either side) on the rear surface side (belt contacting side) via TOF-SIMS.

$$X' = \{A'/(A'+B')\} \times 100$$

Determination conditions via TOF-SIMS were the same as in Example 1. Herein, the heating temperatures of the edge portions of the both sides and the center portion are values based on indicated values of the apparatuses. These indicated values were calibrated using a commercially available normal thermometer. The calibration method is not limited to any specific method. In this case, 3-point calibration was carried out. Further, each of the edge portions of the both sides ranged from its corresponding edge as the reference point to 30% of the total dope width.

TABLE 8

| Sample No. | Width of Cellulose Triacetate Film (mm) | Center Portion A on Front Surface Side | Center Portion B on Rear Surface Side | X | Edge Portion A' on Front Surface Side | Edge Portion B' on Rear Surface Side | X' | Remarks |
|---|---|---|---|---|---|---|---|---|
| 501 | 1300 | 18 | 82 | 18 | 23 | 77 | 23 | Comp. |
| 502 | 1300 | 20 | 80 | 20 | 25 | 75 | 25 | Comp. |
| 503 | 1300 | 30 | 70 | 30 | 40 | 60 | 40 | Comp. |
| 504 | 1300 | 49 | 51 | 49 | 60 | 40 | 60 | Comp. |
| 505 | 1300 | 53 | 47 | 53 | 63 | 37 | 63 | Comp. |
| 506 | 1300 | 30 | 70 | 30 | 25 | 75 | 25 | Comp. |
| 507 | 1300 | 30 | 70 | 30 | 35 | 65 | 35 | Comp. |
| 508 | 1300 | 30 | 70 | 30 | 50 | 50 | 50 | Comp. |
| 509 | 1300 | 30 | 70 | 30 | 60 | 40 | 60 | Comp. |
| 510 | 1300 | 30 | 70 | 30 | 30 | 70 | 30 | Comp. |
| 511 | 1500 | 18 | 82 | 18 | 23 | 77 | 23 | Inv. |
| 512 | 1500 | 20 | 80 | 20 | 25 | 75 | 25 | Inv. |
| 513 | 1500 | 30 | 70 | 30 | 40 | 60 | 40 | Inv. |
| 514 | 1500 | 49 | 51 | 49 | 60 | 40 | 60 | Inv. |
| 515 | 1500 | 53 | 47 | 53 | 63 | 37 | 63 | Inv. |
| 516 | 1500 | 30 | 70 | 30 | 25 | 75 | 25 | Comp. |
| 517 | 1500 | 30 | 70 | 30 | 35 | 65 | 35 | Inv. |
| 518 | 1500 | 30 | 70 | 30 | 50 | 50 | 50 | Inv. |
| 519 | 1500 | 30 | 70 | 30 | 60 | 40 | 60 | Inv. |
| 520 | 1500 | 30 | 70 | 30 | 30 | 70 | 30 | Comp. |
| 521 | 3000 | 18 | 82 | 18 | 23 | 77 | 23 | Inv. |
| 522 | 3000 | 20 | 80 | 20 | 25 | 75 | 25 | Inv. |
| 523 | 3000 | 30 | 70 | 30 | 40 | 60 | 40 | Inv. |
| 524 | 3000 | 49 | 51 | 49 | 60 | 40 | 60 | Inv. |
| 525 | 3000 | 53 | 47 | 53 | 63 | 37 | 63 | Inv. |
| 526 | 3000 | 30 | 70 | 30 | 25 | 75 | 25 | Comp. |
| 527 | 3000 | 30 | 70 | 30 | 35 | 65 | 35 | Inv. |
| 528 | 3000 | 30 | 70 | 30 | 50 | 50 | 50 | Inv. |
| 529 | 3000 | 30 | 70 | 30 | 60 | 40 | 60 | Inv. |
| 530 | 3000 | 30 | 70 | 30 | 30 | 70 | 30 | Comp. |
| 531 | 4000 | 18 | 82 | 18 | 23 | 77 | 23 | Inv. |
| 532 | 4000 | 20 | 80 | 20 | 25 | 75 | 25 | Inv. |
| 533 | 4000 | 30 | 70 | 30 | 40 | 60 | 40 | Inv. |
| 534 | 4000 | 49 | 51 | 49 | 60 | 40 | 60 | Inv. |
| 535 | 4000 | 53 | 47 | 53 | 63 | 37 | 63 | Inv. |
| 536 | 4000 | 30 | 70 | 30 | 25 | 75 | 25 | Comp. |
| 537 | 4000 | 30 | 70 | 30 | 35 | 65 | 35 | Inv. |
| 538 | 4000 | 30 | 70 | 30 | 50 | 50 | 50 | Inv. |
| 539 | 4000 | 30 | 70 | 30 | 60 | 40 | 60 | Inv. |
| 540 | 4000 | 30 | 70 | 30 | 30 | 70 | 30 | Comp. |
| 541 | 4500 | 18 | 82 | 18 | 23 | 77 | 23 | Comp. |
| 542 | 4500 | 20 | 80 | 20 | 25 | 75 | 25 | Comp. |
| 543 | 4500 | 30 | 70 | 30 | 40 | 60 | 40 | Comp. |
| 544 | 4500 | 49 | 51 | 49 | 60 | 40 | 60 | Comp. |
| 545 | 4500 | 53 | 47 | 53 | 63 | 37 | 63 | Comp. |
| 546 | 4500 | 30 | 70 | 30 | 25 | 75 | 25 | Comp. |
| 547 | 4500 | 30 | 70 | 30 | 35 | 65 | 35 | Comp. |
| 548 | 4500 | 30 | 70 | 30 | 50 | 50 | 50 | Comp. |
| 549 | 4500 | 30 | 70 | 30 | 60 | 40 | 60 | Comp. |
| 550 | 4500 | 30 | 70 | 30 | 30 | 70 | 30 | Comp. |

Comp.: Comparative,
Inv.: Inventive

TABLE 9

| Sample No. | Heating Temperature of Belt Anterior Portion (° C.) | | Heating Temperature of Belt Posterior Portion (° C.) | |
|---|---|---|---|---|
| | Both Side Edge Portions | Center Portion | Both Side Edge Portions | Center Portion |
| 501 | 45 | 75 | 70 | 65 |
| 502 | 50 | 72 | 65 | 60 |
| 503 | 55 | 65 | 55 | 50 |
| 504 | 55 | 60 | 60 | 40 |
| 505 | 45 | 50 | 65 | 35 |
| 506 | 70 | 65 | 50 | 55 |
| 507 | 55 | 65 | 58 | 55 |
| 508 | 50 | 65 | 60 | 55 |
| 509 | 45 | 65 | 65 | 55 |
| 510 | 65 | 65 | 55 | 55 |
| 511 | 45 | 75 | 70 | 65 |
| 512 | 50 | 72 | 65 | 60 |
| 513 | 55 | 65 | 55 | 50 |
| 514 | 55 | 60 | 60 | 40 |

TABLE 9-continued

| Sample No. | Heating Temperature of Belt Anterior Portion (° C.) | | Heating Temperature of Belt Posterior Portion (° C.) | |
|---|---|---|---|---|
| | Both Side Edge Portions | Center Portion | Both Side Edge Portions | Center Portion |
| 515 | 45 | 50 | 65 | 35 |
| 516 | 70 | 65 | 50 | 55 |
| 517 | 55 | 65 | 58 | 55 |
| 518 | 50 | 65 | 60 | 55 |
| 519 | 45 | 65 | 65 | 55 |
| 520 | 65 | 65 | 55 | 55 |
| 521 | 45 | 75 | 70 | 65 |
| 522 | 50 | 72 | 65 | 60 |
| 523 | 55 | 65 | 55 | 50 |
| 524 | 55 | 60 | 60 | 40 |
| 525 | 45 | 50 | 65 | 35 |
| 526 | 70 | 65 | 50 | 55 |
| 527 | 55 | 65 | 58 | 55 |
| 528 | 50 | 65 | 60 | 55 |
| 529 | 45 | 65 | 65 | 55 |
| 530 | 65 | 65 | 55 | 55 |
| 531 | 45 | 75 | 70 | 65 |
| 532 | 50 | 72 | 65 | 60 |
| 533 | 55 | 65 | 55 | 50 |
| 534 | 55 | 60 | 60 | 40 |
| 535 | 45 | 50 | 65 | 35 |
| 536 | 70 | 65 | 50 | 55 |
| 537 | 55 | 65 | 58 | 55 |
| 538 | 50 | 65 | 60 | 55 |
| 539 | 45 | 65 | 65 | 55 |
| 540 | 65 | 65 | 55 | 55 |
| 541 | 45 | 75 | 70 | 65 |
| 542 | 50 | 72 | 65 | 60 |
| 543 | 55 | 65 | 55 | 50 |
| 544 | 55 | 60 | 60 | 40 |
| 545 | 45 | 50 | 65 | 35 |
| 546 | 70 | 65 | 50 | 55 |
| 547 | 55 | 65 | 58 | 55 |
| 548 | 50 | 65 | 60 | 55 |
| 549 | 45 | 65 | 65 | 55 |
| 550 | 65 | 65 | 55 | 55 |

Evaluation

With regard to each of sample Nos. 501-550 produced, determination of dynamic friction coefficient, determination of elongation and contraction rate, as well as observation of sticking presence or absence, and observation of convex defect presence or absence were carried out in the same manner as in Example 1. Table 10 shows the results from these evaluations based on the same evaluation ranking as in Example 1.

TABLE 10

| Sample No. | Dynamic Friction Coefficient Ratio* | Elongation and Contraction Rate (%) | | Sticking | Convex Defect | Remarks |
|---|---|---|---|---|---|---|
| | | MD | TD | | | |
| 501 | 1.07 | 0.14 | 0.14 | B | B | Comp. |
| 502 | 1.03 | 0.08 | 0.08 | A | A | Comp. |
| 503 | 1.02 | 0.05 | 0.05 | A | A | Comp. |
| 504 | 1.01 | 0.02 | 0.02 | A | A | Comp. |
| 505 | 0.94 | −0.11 | −0.11 | B | B | Comp. |
| 506 | 0.94 | −0.11 | −0.11 | C | C | Comp. |
| 507 | 1.04 | 0.09 | 0.09 | A | A | Comp. |
| 508 | 1.03 | 0.06 | 0.06 | A | A | Comp. |
| 509 | 1.02 | 0.03 | 0.03 | A | A | Comp. |
| 510 | 1.07 | 0.14 | 0.14 | C | C | Comp. |
| 511 | 1.07 | 0.14 | 0.14 | B | B | Inv. |
| 512 | 1.03 | 0.08 | 0.08 | A | A | Inv. |
| 513 | 1.02 | 0.05 | 0.05 | A | A | Inv. |
| 514 | 1.01 | 0.02 | 0.02 | A | A | Inv. |
| 515 | 0.94 | −0.11 | −0.11 | B | B | Inv. |
| 516 | 0.94 | −0.11 | −0.11 | C | C | Comp. |
| 517 | 1.04 | 0.09 | 0.09 | A | A | Inv. |
| 518 | 1.03 | 0.06 | 0.06 | A | A | Inv. |
| 519 | 1.02 | 0.03 | 0.03 | A | A | Inv. |
| 520 | 1.07 | 0.14 | 0.14 | C | C | Comp. |
| 521 | 1.07 | 0.14 | 0.14 | B | B | Inv. |
| 522 | 1.03 | 0.08 | 0.08 | A | A | Inv. |
| 523 | 1.02 | 0.05 | 0.05 | A | A | Inv. |
| 524 | 1.01 | 0.02 | 0.02 | A | A | Inv. |
| 525 | 0.94 | −0.11 | −0.11 | B | B | Inv. |
| 526 | 0.94 | −0.11 | −0.11 | C | C | Comp. |
| 527 | 1.04 | 0.09 | 0.09 | A | A | Inv. |
| 528 | 1.03 | 0.06 | 0.06 | A | A | Inv. |
| 529 | 1.02 | 0.03 | 0.03 | A | A | Inv. |
| 530 | 1.07 | 0.14 | 0.14 | C | C | Comp. |
| 531 | 1.07 | 0.14 | 0.14 | B | B | Inv. |
| 532 | 1.03 | 0.08 | 0.08 | A | A | Inv. |
| 533 | 1.02 | 0.05 | 0.05 | A | A | Inv. |
| 534 | 1.01 | 0.02 | 0.02 | A | A | Inv. |
| 535 | 0.94 | −0.11 | −0.11 | B | B | Inv. |
| 536 | 0.94 | −0.11 | −0.11 | C | C | Comp. |
| 537 | 1.04 | 0.09 | 0.09 | A | A | Inv. |
| 538 | 1.03 | 0.06 | 0.06 | A | A | Inv. |
| 539 | 1.02 | 0.03 | 0.03 | A | A | Inv. |
| 540 | 1.07 | 0.14 | 0.14 | C | C | Comp. |
| 541 | 1.07 | 0.14 | 0.14 | B | B | Comp. |
| 542 | 1.03 | 0.08 | 0.08 | A | A | Comp. |
| 543 | 1.02 | 0.05 | 0.05 | A | A | Comp. |
| 544 | 1.01 | 0.02 | 0.02 | A | A | Comp. |
| 545 | 0.94 | −0.11 | −0.11 | B | B | Comp. |
| 546 | 0.94 | −0.11 | −0.11 | C | C | Comp. |
| 547 | 1.04 | 0.09 | 0.09 | A | A | Comp. |
| 548 | 1.03 | 0.06 | 0.06 | A | A | Comp. |
| 549 | 1.02 | 0.03 | 0.03 | A | A | Comp. |
| 550 | 1.07 | 0.14 | 0.14 | C | C | Comp. |

Comp.: Comparative,
Inv.: Inventive

A dynamic friction coefficient ratio* represents a ratio of the dynamic friction coefficient of a cellulose triacetate film on the winding outer side to the dynamic friction coefficient thereof on the winding core side. Each of sample Nos. 501-505 and 507-509 has a favorable evaluation result, but due to its relatively small width, no response to increased width is made, resulting in no response to larger image screen sizes which are being demanded on the market. Each of sample Nos. 541-545 and 547-549 has a favorable evaluation result. However, due to its relatively large width, larger peripheral devices, as well as excessive man-hours and cost for maintenance were thought to be needed whereby, these samples were judged to be practically unviable. Thus, the effectiveness of the present invention was confirmed.

Example 6

(Preparation of Dope Composition)

| | |
|---|---|
| Norbornene resin (ARTON G, produced by JSR Corp.) | 100 parts by mass |
| Triphenyl phosphate | 10 parts by mass |
| Ethylphthalyl ethyl glycolate | 2 parts by mass |

-continued

| (Preparation of Dope Composition) | |
|---|---|
| TINUVIN 326 (produced by Ciba Specialty Chemicals, Ltd.) | 1 part by mass |
| AEROSIL 200V (produced by Nihon Aerosil Co., Ltd.) | 0.1 part by mass |
| Methylene chloride | 300 parts by mass |
| Ethanol | 40 parts by mass |

The above materials were sequentially placed in a sealed container and the temperature in the container was raised from 40° C. to 80° C., followed by stirring for 4 hours while the temperature was kept at 70° C. to completely dissolve these materials. Then, stirring was terminated and the liquid temperature was decreased to 46° C. to give a dope via filtration using filter paper (Azumi Filter Paper No. 244, produced by Azumi Filterpaper Co., Ltd.).

(Production of Norbornene Resin Film)

Employing the process shown in FIG. 1, a norbornene resin film was produced as follows. Namely, the thus-prepared dope was cast on a stainless steel endless support belt from a casting dice at 35° C. so as for width to vary as shown in Table 11. Then, using the heating apparatuses shown in FIG. 3 and FIG. 4, the dope was heated under different heating conditions for the edge portions of both sides and the center portion thereof in the anterior portion and the posterior portion of the belt as shown in Table 12. A web having been formed on the belt was peeled therefrom and stretched in the stretching process, followed by drying. Then, norbornene resin films, to be designated as sample Nos. 601-650, were produced with varied value X and value X' as shown in Table 11, wherein value X was calculated by an expression to be described later from value A obtained by determining the amount of a plasticizer present in the center portion on the front surface side (hot air blowing side) of the produced norbornene resin film via TOF-SIMS and value B obtained by determining the amount of a plasticizer present in the center portion on the rear surface side (belt contacting side) via TOF-SIMS, and value X' was calculated by an expression to be described later from value A' obtained by determining the amount of a plasticizer present in an edge portion on the front surface side (hot air blowing side) via TOF-SIMS and value B' obtained by determining the amount of a plasticizer present in an edge portion on the rear surface side (belt contacting side) via TOF-SIMS. Herein, the conveyance rate was 50 m/minute, and drying was carried out at 100° C. for 20 minutes.

Determination via TOF-SIMS was carried out employing each of the methods described below. A specimen of 50 cm long was collected at a point 10 m inward from the termination edge of a produced sample of 5000 m.

(Determination in the Center Potion)

Value X was calculated by the following expression from value A obtained by determining the amount of a plasticizer present in the center portion on the front surface side (hot air blowing side) of the specimen via TOF-SIMS and value B obtained by determining the amount of a plasticizer present in the center portion on the rear surface side (belt contacting side) via TOF-SIMS.

$X=\{A/(A+B)\}\times 100$ (Determination in an Edge Portion)

Value X' is calculated by the following expression from value A' obtained by determining the amount of a plasticizer present in an edge portion (on either side) on the front surface side (hot air blowing side) via TOF-SIMS and value B' obtained by determining the amount of a plasticizer present in an edge portion (on either side) on the rear surface side (belt contacting side) via TOF-SIMS.

$X'=\{A'/(A'+B')\}\times 100$

Determination conditions via TOF-SIMS were the same as in Example 1.

Herein, the heating temperatures of the edge portions of the both sides and the center portion are values based on indicated values of the apparatuses. These indicated values were calibrated using a commercially available normal thermometer. The calibration method is not limited to any specific method. In this case, 3-point calibration was carried out. Further, each of the edge portions of the both sides ranged from its corresponding edge as the reference point to 30% of the total dope width.

TABLE 11

| | | TOF-SIMS Determined Value | | | | | | |
|---|---|---|---|---|---|---|---|---|
| Sample No. | Width of Norbornene Resin Film (mm) | Center Portion A on Front Surface Side | Center Portion B on Rear Surface Side | X | Edge Portion A' on Front Surface Side | Edge Portion B' on Rear Surface Side | X' | Remarks |
| 601 | 1300 | 18 | 82 | 18 | 23 | 77 | 23 | Comparative |
| 602 | 1300 | 20 | 80 | 20 | 25 | 75 | 25 | Comparative |
| 603 | 1300 | 30 | 70 | 30 | 40 | 60 | 40 | Comparative |
| 604 | 1300 | 49 | 51 | 49 | 60 | 40 | 60 | Comparative |
| 605 | 1300 | 53 | 47 | 53 | 63 | 37 | 63 | Comparative |
| 606 | 1300 | 30 | 70 | 30 | 25 | 75 | 25 | Comparative |
| 607 | 1300 | 30 | 70 | 30 | 35 | 65 | 35 | Comparative |
| 608 | 1300 | 30 | 70 | 30 | 50 | 50 | 50 | Comparative |
| 609 | 1300 | 30 | 70 | 30 | 60 | 40 | 60 | Comparative |
| 610 | 1300 | 30 | 70 | 30 | 30 | 70 | 30 | Comparative |
| 611 | 1500 | 18 | 82 | 18 | 23 | 77 | 23 | Inventive |
| 612 | 1500 | 20 | 80 | 20 | 25 | 75 | 25 | Inventive |
| 613 | 1500 | 30 | 70 | 30 | 40 | 60 | 40 | Inventive |
| 614 | 1500 | 49 | 51 | 49 | 60 | 40 | 60 | Inventive |
| 615 | 1500 | 53 | 47 | 53 | 63 | 37 | 63 | Inventive |
| 616 | 1500 | 30 | 70 | 30 | 25 | 75 | 25 | Comparative |
| 617 | 1500 | 30 | 70 | 30 | 35 | 65 | 35 | Inventive |
| 618 | 1500 | 30 | 70 | 30 | 50 | 50 | 50 | Inventive |
| 619 | 1500 | 30 | 70 | 30 | 60 | 40 | 60 | Inventive |

TABLE 11-continued

| Sample No. | Width of Norbornene Resin Film (mm) | TOF-SIMS Determined Value | | | | | | Remarks |
|---|---|---|---|---|---|---|---|---|
| | | Center Portion A on Front Surface Side | Center Portion B on Rear Surface Side | X | Edge Portion A' on Front Surface Side | Edge Portion B' on Rear Surface Side | X' | |
| 620 | 1500 | 30 | 70 | 30 | 30 | 70 | 30 | Comparative |
| 621 | 3000 | 18 | 82 | 18 | 23 | 77 | 23 | Inventive |
| 622 | 3000 | 20 | 80 | 20 | 25 | 75 | 25 | Inventive |
| 623 | 3000 | 30 | 70 | 30 | 40 | 60 | 40 | Inventive |
| 624 | 3000 | 49 | 51 | 49 | 60 | 40 | 60 | Inventive |
| 625 | 3000 | 53 | 47 | 53 | 63 | 37 | 63 | Inventive |
| 626 | 3000 | 30 | 70 | 30 | 25 | 75 | 25 | Comparative |
| 627 | 3000 | 30 | 70 | 30 | 35 | 65 | 35 | Inventive |
| 628 | 3000 | 30 | 70 | 30 | 50 | 50 | 50 | Inventive |
| 629 | 3000 | 30 | 70 | 30 | 60 | 40 | 60 | Inventive |
| 630 | 3000 | 30 | 70 | 30 | 30 | 70 | 30 | Comparative |
| 631 | 4000 | 18 | 82 | 18 | 23 | 77 | 23 | Inventive |
| 632 | 4000 | 20 | 80 | 20 | 25 | 75 | 25 | Inventive |
| 633 | 4000 | 30 | 70 | 30 | 40 | 60 | 40 | Inventive |
| 634 | 4000 | 49 | 51 | 49 | 60 | 40 | 60 | Inventive |
| 635 | 4000 | 53 | 47 | 53 | 63 | 37 | 63 | Inventive |
| 636 | 4000 | 30 | 70 | 30 | 25 | 75 | 25 | Comparative |
| 637 | 4000 | 30 | 70 | 30 | 35 | 65 | 35 | Inventive |
| 638 | 4000 | 30 | 70 | 30 | 50 | 50 | 50 | Inventive |
| 639 | 4000 | 30 | 70 | 30 | 60 | 40 | 60 | Inventive |
| 640 | 4000 | 30 | 70 | 30 | 30 | 70 | 30 | Comparative |
| 641 | 4500 | 18 | 82 | 18 | 23 | 77 | 23 | Comparative |
| 642 | 4500 | 20 | 80 | 20 | 25 | 75 | 25 | Comparative |
| 643 | 4500 | 30 | 70 | 30 | 40 | 60 | 40 | Comparative |
| 644 | 4500 | 49 | 51 | 49 | 60 | 40 | 60 | Comparative |
| 645 | 4500 | 53 | 47 | 53 | 63 | 37 | 63 | Comparative |
| 646 | 4500 | 30 | 70 | 30 | 25 | 75 | 25 | Comparative |
| 647 | 4500 | 30 | 70 | 30 | 35 | 65 | 35 | Comparative |
| 648 | 4500 | 30 | 70 | 30 | 50 | 50 | 50 | Comparative |
| 649 | 4500 | 30 | 70 | 30 | 60 | 40 | 60 | Comparative |
| 650 | 4500 | 30 | 70 | 30 | 30 | 70 | 30 | Comparative |

TABLE 12

| Sample No. | Heating Temperature of Belt Anterior Portion (° C.) | | Heating Temperature of Belt Posterior Portion (° C.) | |
|---|---|---|---|---|
| | Both Side Edge Portions | Center Portion | Both Side Edge Portions | Center Portion |
| 601 | 45 | 75 | 70 | 65 |
| 602 | 50 | 72 | 65 | 60 |
| 603 | 55 | 65 | 55 | 50 |
| 604 | 55 | 60 | 60 | 40 |
| 605 | 45 | 50 | 65 | 35 |
| 606 | 70 | 65 | 50 | 55 |
| 607 | 55 | 65 | 58 | 55 |
| 608 | 50 | 65 | 60 | 55 |
| 609 | 45 | 65 | 65 | 55 |
| 610 | 65 | 65 | 55 | 55 |
| 611 | 45 | 75 | 70 | 65 |
| 612 | 50 | 72 | 65 | 60 |
| 613 | 55 | 65 | 55 | 50 |
| 614 | 55 | 60 | 60 | 40 |
| 615 | 45 | 50 | 65 | 35 |
| 616 | 70 | 65 | 50 | 55 |
| 617 | 55 | 65 | 58 | 55 |
| 618 | 50 | 65 | 60 | 55 |
| 619 | 45 | 65 | 65 | 55 |
| 620 | 65 | 65 | 55 | 55 |
| 621 | 45 | 75 | 70 | 65 |
| 622 | 50 | 72 | 65 | 60 |
| 623 | 55 | 65 | 55 | 50 |
| 624 | 55 | 60 | 60 | 40 |
| 625 | 45 | 50 | 65 | 35 |
| 626 | 70 | 65 | 50 | 55 |
| 627 | 55 | 65 | 58 | 55 |
| 628 | 50 | 65 | 60 | 55 |
| 629 | 45 | 65 | 65 | 55 |
| 630 | 65 | 65 | 55 | 55 |
| 631 | 45 | 75 | 70 | 65 |
| 632 | 50 | 72 | 65 | 60 |
| 633 | 55 | 65 | 55 | 50 |
| 634 | 55 | 60 | 60 | 40 |
| 635 | 45 | 50 | 65 | 35 |
| 636 | 70 | 65 | 50 | 55 |
| 637 | 55 | 65 | 58 | 55 |
| 638 | 50 | 65 | 60 | 55 |
| 639 | 45 | 65 | 65 | 55 |
| 640 | 65 | 65 | 55 | 55 |
| 641 | 45 | 75 | 70 | 65 |
| 642 | 50 | 72 | 65 | 60 |
| 643 | 55 | 65 | 55 | 50 |
| 644 | 55 | 60 | 60 | 40 |
| 645 | 45 | 50 | 65 | 35 |
| 646 | 70 | 65 | 50 | 55 |
| 647 | 55 | 65 | 58 | 55 |
| 648 | 50 | 65 | 60 | 55 |
| 649 | 45 | 65 | 65 | 55 |
| 650 | 65 | 65 | 55 | 55 |

Evaluation

With regard to each of sample Nos. 601-650 produced, determination of dynamic friction coefficient, determination of elongation and contraction rate, as well as observation of sticking presence or absence, and observation of convex defect presence or absence were carried out in the same manner as in Example 1. Table 13 shows the results from these evaluations based on the same evaluation ranking as in Example 1.

TABLE 13

| Sample No. | Dynamic Friction Coefficient Ratio* | Elongation and Contraction Rate (%) MD | TD | Sticking | Convex Defect | Remarks |
| --- | --- | --- | --- | --- | --- | --- |
| 601 | 1.07 | 0.14 | 0.14 | B | B | Comp. |
| 602 | 1.03 | 0.08 | 0.08 | A | A | Comp. |
| 603 | 1.02 | 0.05 | 0.05 | A | A | Comp. |
| 604 | 1.01 | 0.02 | 0.02 | A | A | Comp. |
| 605 | 0.94 | −0.11 | −0.11 | B | B | Comp. |
| 606 | 0.94 | −0.11 | −0.11 | C | C | Comp. |
| 607 | 1.04 | 0.09 | 0.09 | A | A | Comp. |
| 608 | 1.03 | 0.06 | 0.06 | A | A | Comp. |
| 609 | 1.02 | 0.03 | 0.03 | A | A | Comp. |
| 610 | 1.07 | 0.14 | 0.14 | C | C | Comp. |
| 611 | 1.07 | 0.14 | 0.14 | B | B | Inv. |
| 612 | 1.03 | 0.08 | 0.08 | A | A | Inv. |
| 613 | 1.02 | 0.05 | 0.05 | A | A | Inv. |
| 614 | 1.01 | 0.02 | 0.02 | A | A | Inv. |
| 615 | 0.94 | −0.11 | −0.11 | B | B | Inv. |
| 616 | 0.94 | −0.11 | −0.11 | C | C | Comp. |
| 617 | 1.04 | 0.09 | 0.09 | A | A | Inv. |
| 618 | 1.03 | 0.06 | 0.06 | A | A | Inv. |
| 619 | 1.02 | 0.03 | 0.03 | A | A | Inv. |
| 620 | 1.07 | 0.14 | 0.14 | C | C | Comp. |
| 621 | 1.07 | 0.14 | 0.14 | B | B | Inv. |
| 622 | 1.03 | 0.08 | 0.08 | A | A | Inv. |
| 623 | 1.02 | 0.05 | 0.05 | A | A | Inv. |
| 624 | 1.01 | 0.02 | 0.02 | A | A | Inv. |
| 625 | 0.94 | −0.11 | −0.11 | B | B | Inv. |
| 626 | 0.94 | −0.11 | −0.11 | C | C | Comp. |
| 627 | 1.04 | 0.09 | 0.09 | A | A | Inv. |
| 628 | 1.03 | 0.06 | 0.06 | A | A | Inv. |
| 629 | 1.02 | 0.03 | 0.03 | A | A | Inv. |
| 630 | 1.07 | 0.14 | 0.14 | C | C | Comp. |
| 631 | 1.07 | 0.14 | 0.14 | B | B | Inv. |
| 632 | 1.03 | 0.08 | 0.08 | A | A | Inv. |
| 633 | 1.02 | 0.05 | 0.05 | A | A | Inv. |
| 634 | 1.01 | 0.02 | 0.02 | A | A | Inv. |
| 635 | 0.94 | −0.11 | −0.11 | B | B | Inv. |
| 636 | 0.94 | −0.11 | −0.11 | C | C | Comp. |
| 637 | 1.04 | 0.09 | 0.09 | A | A | Inv. |
| 638 | 1.03 | 0.06 | 0.06 | A | A | Inv. |
| 639 | 1.02 | 0.03 | 0.03 | A | A | Inv. |
| 640 | 1.07 | 0.14 | 0.14 | C | C | Comp. |
| 641 | 1.07 | 0.14 | 0.14 | B | B | Comp. |
| 642 | 1.03 | 0.08 | 0.08 | A | A | Comp. |
| 643 | 1.02 | 0.05 | 0.05 | A | A | Comp. |
| 644 | 1.01 | 0.02 | 0.02 | A | A | Comp. |
| 645 | 0.94 | −0.11 | −0.11 | B | B | Comp. |
| 646 | 0.94 | −0.11 | −0.11 | C | C | Comp. |
| 647 | 1.04 | 0.09 | 0.09 | A | A | Comp. |
| 648 | 1.03 | 0.06 | 0.06 | A | A | Comp. |
| 649 | 1.02 | 0.03 | 0.03 | A | A | Comp. |
| 650 | 1.07 | 0.14 | 0.14 | C | C | Comp. |

Comp.: Comparative,
Inv.: Inventive

A dynamic friction coefficient ratio* represents a ratio of the dynamic friction coefficient of a norbornene resin film on the winding outer side to the dynamic friction coefficient thereof on the winding core side. Each of sample Nos. 601-605 and 607-609 has a favorable evaluation result, but due to its relatively small width, no response to increased width is made, resulting in no response to larger image screen sizes which are being demanded on the market. Each of sample Nos. 641-645 and 647-649 has a favorable evaluation result. However, due to its relatively large width, larger peripheral devices, as well as excessive man-hours and cost for maintenance were thought to be needed, whereby, these samples were judged to be practically unviable. Thus, the effectiveness of the present invention was confirmed.

Example 7

Using cellulose triacetate propionate film Nos. 101-118 produced in Example 1, steel-made polarization plates as shown in FIG. 6 were produced and designated as sample Nos. 701-718. These polarization plates had a size of 200 mm×300 mm. Each of these was used for the polarization plate section of the display panel in a liquid crystal display, and then visibility of the display image screen was visually evaluated.

Evaluation

Visibility of the image screen employing each of sample Nos. 701-718 produced was examined via the following method. The evaluated results based on evaluation ranking described later are listed in Table 14.

Evaluation Method of Image Screen Visibility

Removed were both of the polarization plates previously bonded to the visual side and the backlight side of 15 diagonal inch display VL-150SD (produced by Fujitsu Ltd.), being a VA type liquid crystal display. Then, a polarization plate produced above was bonded to the glass surface of the liquid crystal cell to produce a liquid crystal display. In this case, a polarization plate protective film produced above was allowed to face the liquid crystal surface side, and the polarization plate was bonded in such a manner that the absorption axis thereof was directed in the same direction as that of the originally bonded polarization plate.

It is known that visibility such as contrast varies with adjustment of image screen luminance based on ambient brightness during image viewing. The backlight of the thus-produced liquid crystal display was continuously lighted for 100 hours in a bright room, and visibility in the initial period and after the elapse of 100 hours was visually evaluated.

Evaluation Ranking of Image Screen Visibility

A: Black looks clear with enhanced sharpness.
B: Black looks unclear with slightly decreased sharpness.
C: Black looks unclear with decreased sharpness.

TABLE 14

| Sample No. | Used Cellulose Triacetate Film No. | Image Screen Visibility | Remarks |
| --- | --- | --- | --- |
| 701 | 101 | A | Comparative |
| 702 | 102 | C | Comparative |
| 703 | 103 | C | Comparative |
| 704 | 104 | A | Inventive |
| 705 | 105 | C | Comparative |
| 706 | 106 | C | Comparative |
| 707 | 107 | A | Inventive |
| 708 | 108 | C | Comparative |
| 709 | 109 | C | Comparative |
| 710 | 110 | A | Inventive |
| 711 | 111 | C | Comparative |
| 712 | 112 | C | Comparative |
| 713 | 113 | A | Inventive |
| 714 | 114 | C | Comparative |
| 715 | 115 | C | Comparative |
| 716 | 116 | A | Inventive |
| 717 | 117 | C | Comparative |
| 718 | 118 | C | Comparative |

Sample No. 701 had the same result as the samples of the present invention. However, due to its relatively small width, no response to increased width can be made, resulting in no response to larger image screen sizes which are being demanded on the market. Sample No. 716 had the same result as the samples of the present invention. However, due to its relatively large width, larger peripheral devices, as well as excessive man-hours and cost for maintenance were thought to be needed, whereby, this sample was judged to be practically unviable. Thus, the effectiveness of the present invention was confirmed.

The invention claimed is:

1. An optical film comprising at least one type of plasticizer and is produced in a roll form, the optical film being produced by casting a dope, prepared by dissolving a raw material resin in a solvent, on an endless support to form a web, then the web being peeled from the endless support, followed by drying and winding, wherein the optical film has a total width of 1500 mm-4000 mm; value X and value X' differ from each other, provided that value X is calculated by Expression 1 using value A which is an amount of a plasticizer present in a center portion on a front surface side of the optical film determined via TOF-SIMS (time of flight secondary ion mass spectrometry) and value B which is an amount of a plasticizer present in a center portion on a rear surface side of the optical film determined via TOF-SIMS, and value X' is calculated by Expression 2 from value A' which is an amount of a plasticizer present in an edge portion on the front surface side of the optical film determined via TOF-SIMS and value B' which is an amount of a plasticizer present in an edge portion on the rear surface side of the optical film determined via TOF-SIMS; and value X is smaller than value X':

$$X=\{A/(A+B)\}\times 100 \quad \text{Expression 1}$$

$$X'=\{A'/(A'+B')\}\times 100, \quad \text{Expression 2}$$

wherein value X is 20-49 and $A \leq B$, and
value X' is 5-30 larger than value X and $A' \leq B'$.

2. The optical film of claim 1, wherein a total length of the optical film is from 1500 m-10000 m, and a ratio of a dynamic friction coefficient of the optical film on a winding outer side to a dynamic friction coefficient of the optical film on a winding core side is 0.95-1.05.

3. The optical film of claim 1, wherein a width of the edge portions is a distance determined between an edge side of the optical film as a reference point and a given location located in the range of 10%-40% of the total width of the optical film.

4. The optical film of claim 1, wherein the raw material resin of the optical film is a cellulose ester.

5. The optical film of claim 1, wherein elongation and contraction rates of the optical film, represented by the following Expressions 3 and 4, after being allowed to stand for 7 days at a temperature of 30° C. and a relative humidity of 80%, each are −0.10%-+0.10%:

$$\{(\text{Length in the MD direction after treatment}-\text{length in the MD direction prior to treatment})/\text{length in the MD direction prior to treatment}\}\times 100=\text{elongation and contraction rate in the MD direction} \quad \text{Expression 3}$$

$$\{(\text{Length in the TD direction after treatment}-\text{length in the TD direction prior to treatment})/\text{length in the TD direction prior to treatment}\}\times 100=\text{elongation and contraction rate in the TD direction.} \quad \text{Expression 4}$$

6. A process for producing the optical film of claim 1, the process comprising the steps of:
casting a dope, prepared by dissolving a raw material resin in a solvent, on an endless support to form a web;
peeling the web from the endless support; and
drying and winding the peeled web,
wherein, while the web is peeled from the endless support, the center portion in a transverse direction and edge portions on both sides of the web are heated at different temperatures; and a heating temperature of the center portion is higher than a heating temperature of the edge portions in an anterior portion of the endless support, and a heating temperature of the center portion is lower than a heating temperature of the edge portions in a posterior portion of the endless support.

7. A polarization plate utilizing the optical film of claim 1.

8. The process for producing the optical film of claim 6, wherein the heating temperature of the center portion in the anterior portion of the endless support is 1° C.-20° C. higher than the heating temperature of the edge portions on the both sides.

9. The process for producing the optical film of claim 6, wherein the heating temperature of the center portion in the posterior portion of the endless support is 1° C.-20° C. lower than the heating temperature of the edge portions on the both sides.

10. The process for producing the optical film of claim 6, wherein a width of the edge portions is a distance determined between an edge side of the optical film as a reference point and a given location located in the range of 10%-40% of a total width of the web.

11. The process for producing the optical film of claim 6, wherein a total length of the optical film is from 1500 m-10000 m.

* * * * *